United States Patent
Hemphill et al.

(10) Patent No.: US 7,566,286 B2
(45) Date of Patent: Jul. 28, 2009

(54) POWER SHIFT GEAR FOR MOTOR VEHICLES, A MOTOR VEHICLE GEAR AS WELL AS A MOTOR VEHICLE POWER TRAIN

(75) Inventors: Jeffrey Hemphill, Copley, OH (US); Philip George, Wooster, OH (US); William Brees, Wooster, OH (US); Geir Huseby, Vestfossen (NO); Oswald Friedmann, Lichtenau (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 211 days.

(21) Appl. No.: 11/247,410

(22) Filed: Oct. 11, 2005

(65) Prior Publication Data

US 2006/0079368 A1 Apr. 13, 2006

Related U.S. Application Data

(60) Provisional application No. 60/617,863, filed on Oct. 12, 2004.

(51) Int. Cl.
*F16H 37/02* (2006.01)
(52) U.S. Cl. ............... 475/303; 475/330; 475/214; 475/219
(58) Field of Classification Search ............ 475/214, 475/298–300, 303, 330, 219
See application file for complete search history.

(56) References Cited

U.S. PATENT DOCUMENTS

| 2,418,378 | A | * | 4/1947 | Voytech | ............... 475/281 |
|---|---|---|---|---|---|
| 3,115,792 | A | * | 12/1963 | Grattan | ............... 475/258 |
| 5,263,906 | A | * | 11/1993 | Antonov | ............... 475/257 |
| 5,966,989 | A | * | 10/1999 | Reed et al. | ............... 74/331 |
| 6,811,512 | B2 | * | 11/2004 | Usoro et al. | ............... 475/276 |
| 6,835,157 | B2 | * | 12/2004 | Haka | ............... 475/269 |
| 7,004,881 | B2 | * | 2/2006 | Haka | ............... 475/303 |

FOREIGN PATENT DOCUMENTS

| EP | 1 422 442 | 5/2004 |
|---|---|---|
| EP | 1 422 443 | 5/2004 |
| EP | 1 422 444 | 5/2004 |
| EP | 1 422 446 | 5/2004 |

\* cited by examiner

*Primary Examiner*—Tisha D Lewis
(74) *Attorney, Agent, or Firm*—Simpson & Simpson, PLLC

(57) ABSTRACT

A power shift gear for motor vehicles with a first subgear that has a first planetary gear. The first planetary gear has at least one sun wheel, at least one ring gear, several planet wheels and at least one planet carrier. The at least one sun wheel has a toothing for engagement in toothings of planet wheels and with several speed clutches for the engagement and disengagement of speeds in the first subgear. The power shift gear includes a second subgear with several speed clutches for the engagement and disengagement of speeds in the second subgear. The second subgear is connected parallel to the first subgear. The speed clutches for the first subgear are arranged radially outside the toothing of at least one sun wheel of the first subgear.

16 Claims, 12 Drawing Sheets

Normal Synchronizer

Planetary Synchronizer

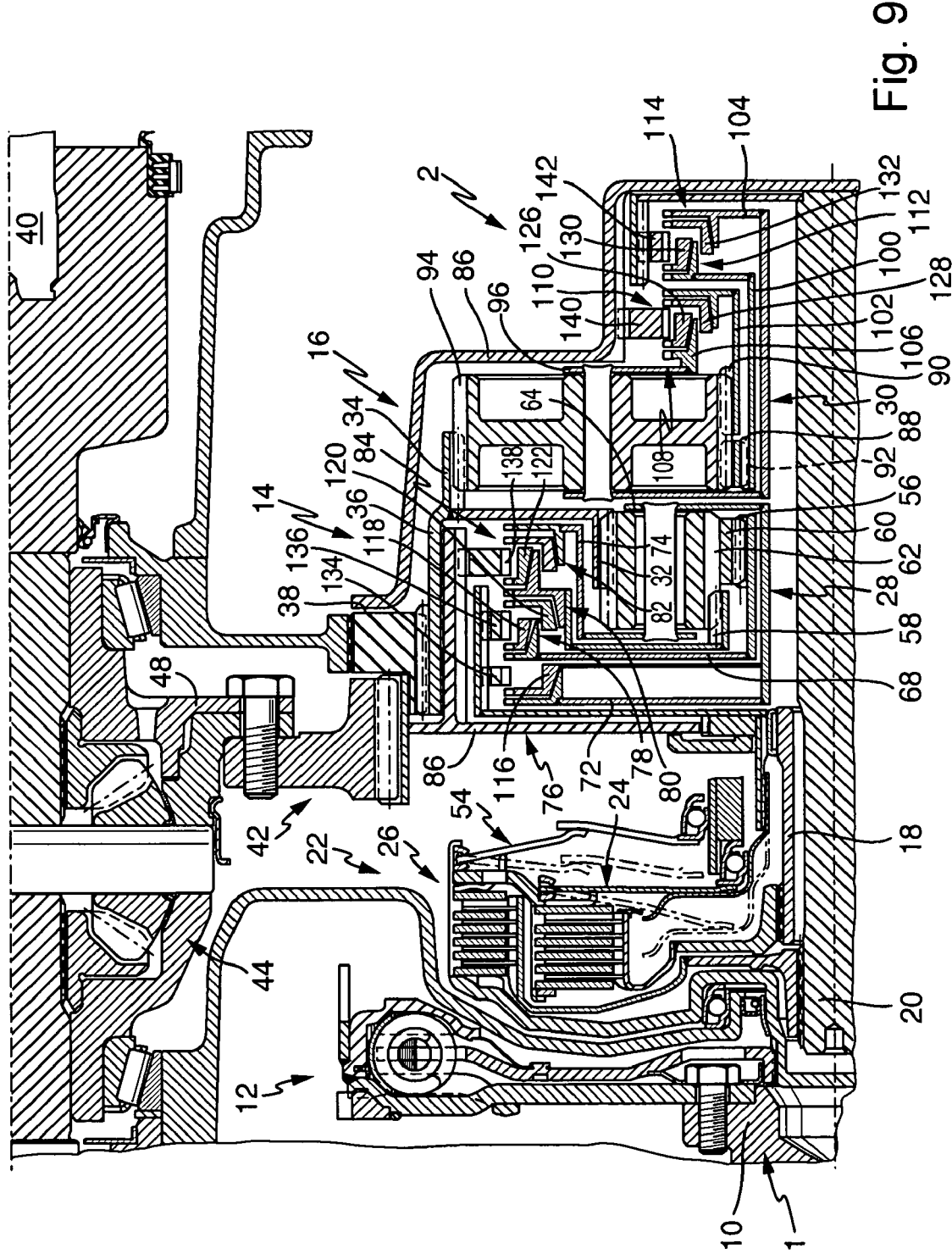

POWER SHIFT GEAR FOR MOTOR VEHICLES, A MOTOR VEHICLE GEAR AS WELL AS A MOTOR VEHICLE POWER TRAIN

CROSS-REFERENCE TO RELATED APPLICATIONS

This application claims the benefit of U.S. Provisional Patent Application Ser. No. 60/617,863, filed on Oct. 12, 2004, which is expressly incorporated by reference herein.

BACKGROUND OF THE INVENTION

This invention relates to power shift gears for motor vehicles, a motor vehicle gear as well as a motor vehicle power train.

The overwhelming majority of known vehicles or motor vehicles have either manual auxiliary shafts or automatic gears that are provided with a planetary gear. Also known are power shift gears, such as, for example, parallel gearboxes (PSG), where an auxiliary shaft with two (main) gear shafts is combined with an (automated) actuation in order, for example, to improve the switching comfort and to develop the fuel consumption in a more economical manner.

In such power shift gears or parallel gearboxes (PSG), the engageable and disengageable speeds (as a rule, there are two of them) are divided over two subgears that are connected parallel, and each of which has a main gear shaft. Power shift gears or parallel gearboxes (PSG) make it possible to switch between speeds so as not to interrupt the traction force. It is especially for this purpose that known designs of each of the parallel-connected subgears are connected on the input side via a separate clutch or a friction clutch with the power takeoff shaft of the internal combustion engine. When one of these clutches is disengaged, then, in the pertinent subgear, one can set a target speed, while simultaneously via the other subgear, torque can be transmitted from the combustion engine in the direction of the motor vehicle driving axles, and the clutch to the combustion engine, associated with that subgear, is engaged and vice versa. By engaging the initially disengaged clutch and disengaging the initially engaged clutch in a controlled manner, one can, from the particular output speed of one of the subgears, switch over into a target speed of the other particular subgear, whereby during this gear change process, the disengagement and engagement of the clutches will take place in an overlapping fashion in such a manner that throughout the entire gear change process, torque will be transmitted from the combustion engine to the driving axle.

EP 1422442 A, EP 1422443 A, EP 1422444 A and EP 1422446 A disclose motor vehicle gears that have two parallel-connected subgears and where a planetary gear is provided in each of these subgears.

SUMMARY OF THE INVENTION

The invention provides for a power shift gear according to Claim 1 or according to Claim 6 or according to Claim 17 or according to Claim 18 or according to Claim 21. The invention-based motor vehicle gear is the object of Claim 22.

The invention, in particular, proposes a power shift gear for motor vehicles, which power shift gear displays a first subgear and second subgear that is connected parallel to the first subgear. The first subgear has a (first) planetary gear, and this first planetary gear has at least one sun wheel, at least one ring gear, several planet wheels and at least one planet carrier. This one sun wheel has a toothing for engagement in toothings of planet wheels. This toothing of this sun wheel, in particular, engages toothings of planet wheels. One can also provide several sun wheels of the first planetary gear, whereby these wheels, in particular, can engage various, in particular, several planet wheels via its toothing. Several speed clutches are also provided for engaging and disengaging speeds in the first subgear and several speed clutches are provided for engaging and disengaging speeds in the second subgear. All speed clutches for engaging and disengaging speeds in the first subgear and/or all speed clutches for engaging and disengaging speeds in the second subgear are arranged radially outside this toothing of at least one sun wheel and/or—provided they are present—possibly the sun wheels of this first subgear.

The invention furthermore, in particular, proposes a power shift gear for motor vehicles, where this power shift gear has a first subgear and a second subgear that is connected parallel to the first subgear. The first subgear here has a (first) planetary gear. Furthermore, several speed clutches are provided for the engagement and disengagement of speeds in the first subgear and several speed clutches are provided for the engagement and disengagement of speeds in the second subgear. A control unit or an actuator is provided to actuate these speed clutches. This control unit or this actuator displays at least one hollow—preferably essentially a first—part that is made in the manner of a hollow cylinder and that is positioned movably, in particular, in a splined manner and, in a particularly preferred manner, in an axially fixed manner and that extends around the (first) planetary gear (of the first subgear), specifically, in particular, radially outside.

At least one hollow first part is provided especially for the actuation of speed clutches, in particular, all speed clutches of the first planetary gear or subgear and/or for the actuation of synchronization devices of such speed clutches of the first planetary gear.

The first hollow part is preferably a camshaft controller and, in a particularly preferred manner, it is a camshaft controller that for purposes of actuation displays a profiling, such as an arrangement of grooves or the like, on its (radial) internal surface. Several first hollow parts can also be provided for the actuation of the speed clutches or the synchronization devices of the first planetary gear, which synchronization devices are provided here in a particularly preferred manner. For example, they can be (several) concentric hydraulic cylinders that are provided for the actuation of the speed clutches or the synchronization devices. Such speed clutches or synchronization devices, for instance, can also be provided for the speed clutches or the synchronization device of the second subgear, which, in a particularly preferred manner, likewise has a (second) planetary gear.

The invention furthermore, in particular, proposes a power shift gear for motor vehicles, whereby this power shift gear has a first subgear and a second subgear, which, in particular, is connected parallel to the first subgear. The second subgear has a (second) planetary gear. Provision can also be made that the first subgear will furthermore have a (first) planetary gear. Several speed clutches are furthermore provided for the engagement and disengagement of speeds in the first subgear, along with several speed clutches for the engagement and disengagement of speeds in the second subgear. A control unit or an actuator is also provided for the actuation of these speed clutches or their synchronization devices. This control unit has several (third) parts that in each case are arranged in an axially movable manner, such as, for example, in particular, it has hydraulic cylinders that are essentially arranged in a circular pattern around the second planetary gear. Provision can also be made that such (third) parts, such as hydraulic cylinders, will be present in an essentially circular arrangement also around the first subgear or the planetary gear. These third parts are provided, in particular, for the actuation of the speed clutches or their synchronization devices of the first or second subgear or planetary gear. The third parts can also be so arranged that their arrangement pattern will extend around the first or the second planetary gear without being arranged here in a circular pattern. These third parts or their axial directions are preferably located parallel with respect to each other.

The invention furthermore proposes a power shift gear for motor vehicles, whereby this power shift gear has a first subgear and a second subgear that, in particular, is connected parallel to the first subgear. The first subgear in this case has a (first) planetary gear. Furthermore, several speed clutches are provided for the engagement and disengagement of speeds in the first subgear, and several speed clutches are provided for the engagement and disengagement of speeds in the second subgear. A control unit or an actuator is furthermore provided for the purpose of actuating these speed clutches. This control unit has an electric motor; specifically, it has one. All speed clutches can be actuated by means of this electric motor for the engagement and disengagement of speeds in the first subgear and in the second subgear.

The invention furthermore proposes a power shift gear for motor vehicles, whereby this power gear has a first subgear and a second subgear that is connected parallel to the first subgear. The first subgear in this case has a (first) planetary gear and the second subgear has a (second) planetary gear. A ring gear of the first planetary gear is connected with a ring gear of the second planetary gear in a splined manner. This connection, for example, can be made in a nonreleasable fashion or in such a way that it will be nonreleasable when in operation, such as it can happen, for example, by means of a screw connection.

Special speeds can be engaged in each case in the first and in the second subgear or planetary gear. The first and/or planetary gear, for example, can be a Ravigneaux gear or a Simpson gear.

Preferably, the first and second subgears in each case have a planetary gear. In a particularly preferred manner, the—especially all—speed clutches are made as synchronized clutches or as clutches with a particular synchronization device, in particular, in the form of synchronized claw clutches or as a claw clutch with a particular synchronization device.

In a particularly preferred manner, the synchronization devices of the speed clutches of the first subgear or planetary gear are arranged radially outside the toothing (for engagement in toothings of planet wheels) of at least one or the sun wheel of this first planetary gear. Provided the first planetary gear has several sun wheels, provisions is also made that the or all synchronization devices of the speed clutches of the first subgear or planetary gear are arranged radially outside all toothings (for engagement in toothings of planet wheels) of these sun wheels of the first planetary gear.

In a particularly preferred manner, the or all synchronization devices of the speed clutches of the second subgear or planetary gear are arranged radially outside the toothing (for engagement in toothings of planet wheels) of at least one or the sun wheel of this second planetary gear. Provided the second planetary gear has several sun wheels, it is also provided that the or all synchronization devices of the speed clutches of the second subgear or planetary gear are arranged radially outside of all of the toothings (for engagement in toothings of planet wheels) of these sun wheels of the second planetary gear.

According to a particularly preferred design, it is provided that the or all synchronization devices of the speed clutches of the first subgear or planetary gear are arranged radially outside the gear (toothings) (for engagement in toothings of planet wheels) of at least one or of the or of all ring gears of this first planetary gear.

Preferably, these arrangements of the synchronization device in each case relate to the segment or surface areas that, during synchronization, will contact each other, although they can be remote from each other outside synchronization.

The invention furthermore provides a motor vehicle gear that has several wheel sets to form speeds as well as several speed clutches for the engagement and disengagement of speeds and a torque transmission device that acts as a clutch, whereby this torque transmission device is made up of a planetary gear and a brake device that cooperates with this planetary gear.

Provision can be made that this planetary gear will be part of a wheel set for the formation of a speed or that this planetary gear will differ from these wheel sets for the formation of speeds.

The invention furthermore provides especially a motor vehicle power train that has a power takeoff shaft or crankshaft that can be driven by an internal combustion engine and at least one driving axle as well as a gear device arranged between this power takeoff shaft and this driving axle by means of which one can alter the speed increase ratio between this power takeoff shaft and this driving axle, whereby the gear device is made in accordance with the invention-based design.

The invention-based power shift gear is preferably controlled in an automated fashion, specifically by means of an electronic control unit. The invention-based power shift gear is preferably an electronic automated gearbox (ESG) or a dual-clutch gear (DKG) or a parallel gearbox (PSG).

Applicant reserves the right to change the references in the subclaims in each case "according to one of the prior claims," because the resultant designs are particularly preferred. Considering also the preceding text, special designs are furthermore preferred as they result from the combination of the particularly characterizing part of one or several subclaims with the features of one or several Claims 1, 6, 18, 19 and 23. Also preferred are the designs that result from a combination of several (random) designs among the independent claims. In particular, the abovementioned designs can also be further developed by individual or by several features according to the description or according to the figures. Applicant, in particular, reserves the right to adjust patent claims also to such designs that result from these abovementioned combinations.

The object of the invention is to provide a competitive, reasonably priced power shift gear that will operate safely and reliably.

According to another aspect, the object of the invention is to provide a power shift gear that will operate reliably and that can be made at reasonable cost and that nevertheless is rather lightweight.

According to another aspect, the object of the invention is to create a power shift gear that has a structurally compact design or that can at least be designed in a structurally compact manner.

According to another aspect, the object of the invention is to provide a power shift gear that will promote low motor vehicle fuel consumption.

According to another aspect, the object of the invention is to provide a power shift gear that can be actuated in a simple or structurally simple manner.

According to another aspect, the object of the invention is to provide a power shift gear that can be well adapted to the structural space requirements.

BRIEF DESCRIPTION OF THE DRAWINGS

Exemplary embodiments of the invention will now be explained in greater detail with reference to the figures; it should be noted that the invention is not confined to these exemplary embodiments. The following is shown:

FIG. 9 is a diagram, illustrating another exemplary invention-based motor vehicle power train with an exemplary invention-based power shift gear;

DETAILED DESCRIPTION OF THE INVENTION

Figure 1:
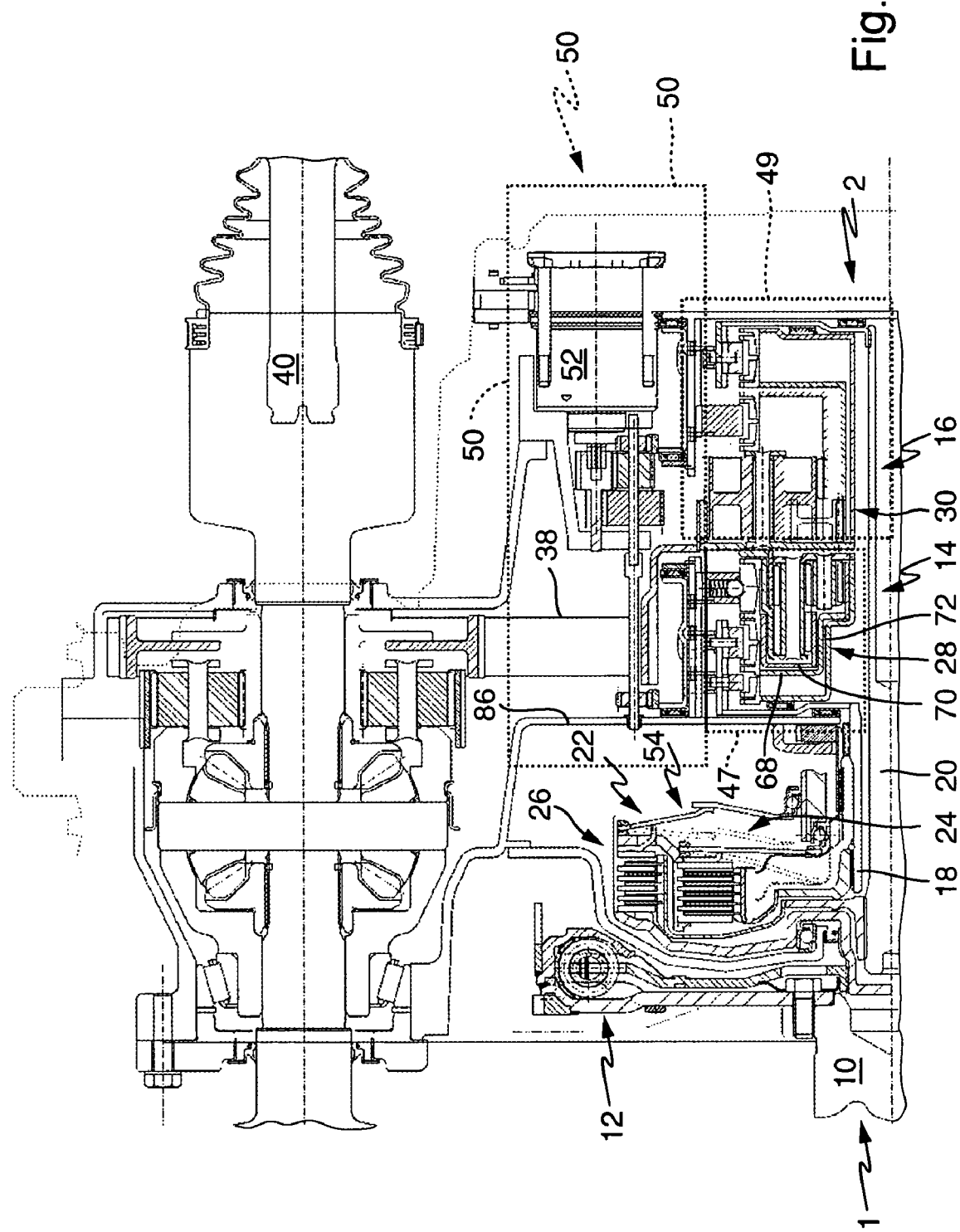
FIG. 1 is a diagram, illustrating an exemplary invention-based motor vehicle power train with an exemplary invention-based power train gear.

FIG. 1 is a diagram, showing an exemplary invention-based motor vehicle power train 1 and a diagram showing an exemplary invention-based power shift gear 2.

Motor vehicle power train 1 has a power takeoff shaft 10 that is associated with an internal combustion engine, not shown, and that can be driven by said engine. A dual inertial flywheel (ZMS) 12 is connected to this power takeoff shaft 10. The power shift gear 2 is arranged in the power train on the output side of the dual inertial flywheel 12, in other words, on the side facing away from the internal combustion engine.

Power shift gear 2 has a first subgear 14 as well as a second subgear 16. The first subgear 14 has a first main gear shaft 18, which in this case is made as a hollow shaft. The second subgear 16 has a second main gear shaft 20 around which the first main gear shaft 18 extends radially outward. A dual clutch 22 is provided between power takeoff shaft 10 or the dual inertial flywheel 12 and the two main gear shafts 18, 20. Dual clutch 22 has a first clutch 24 as well as a second clutch 26. In this exemplary embodiment, these two clutches 24, 26 are each made as multiple-disc clutches, but they can also be designed differently, in which case, they are made, in particular, as a friction clutch. The first clutch 24 is connected with the first main gear shaft 18 and the second clutch 26 is connected with the second main gear shaft 20. Furthermore, these two clutches 24, 26 are connected with the dual inertial flywheel 12 or the power takeoff shaft 10. The subgears 14, 16 can optionally be connected into the torque flow by means of these clutches 24, 26 that can also be referred to as starting or power shift clutch. Besides, using this dual clutch 22, one can shift between the speeds of the two subgears 14, 16 without interrupting the traction force.

The first subgear 14 is connected parallel to the second subgear 16. The first subgear 14 has a first planetary gear 28 and the second subgear 16 has a second planetary gear 30. The first planetary gear 28 is arranged on the first main gear shaft 18 and the second planetary gear 30 is arranged on the second main gear shaft 20.

In the exemplary embodiment according to FIG. 1, the first planetary gear 28 as well as the second planetary gear 30 in each case are made as a Ravigneaux gear.

The ring gear 32 of the first planetary gear 28 is firmly connected with the ring gear 34 of the second planetary gear 30.

A common prolongation 36 of the ring gears 32, 34 has a gear rim or gear wheel in which engages or which is engaged by a transmission chain or chain 38 to form a torque connection in the direction of the driving axle or the driving axles 40.

This one gear rim or this gear wheel is connected with the output of both wheel sets 43, 45, in other words, of the wheel set 43 of the first planetary gear 28 and of the wheel set 45 of the second planetary gear 30. In particular, it is provided that by means of planet wheel set 43, one can switch the even speeds and the reverse speed (see the dotted area 47 with wheel set 43 for the even speeds), and by means of the planet wheel set 45, one can switch the odd speeds (see dotted area 49 with wheel set 45 for the odd speeds).

Chain 38 furthermore engages a wheel set 42 that is connected on the output side with a differential 44. The drive axles 40 are provided on the output side of the differential 44.

Wheel set 42 is made as a planetary gear in this case, whereby sun wheel 46 of this planetary gear forms the input, which can be driven by chain 38, and where planet carrier 48 forms the output of this wheel set 42 that engages the differential.

Also provided is an actuation system or a control unit 50 for the power shift gear 2. This control unit 50 has precisely one electric motor 52 by means of which one can engage and disengage speeds of the first subgear 14 as well as the second subgear 16. The electric motor can be driven in opposite directions.

A schematically indicated control unit 54 is provided to actuate the dual clutch 22; by means of this control unit, one can actuate the two clutches 24, 26 of the dual clutch 22, in other words, in particular, they can be disengaged and engaged. Control unit 54, for the purpose of actuating dual clutch 22, for example, can have one or two electric motors. Provision can be made that the electric motors of such a control unit 54 for the dual clutch 22 and/or the electric motor 52 of the control unit 50 for the power shift gear or the planetary gears 28, 30 of the power shift gear be triggered by an electronic control unit.

Figure 2:
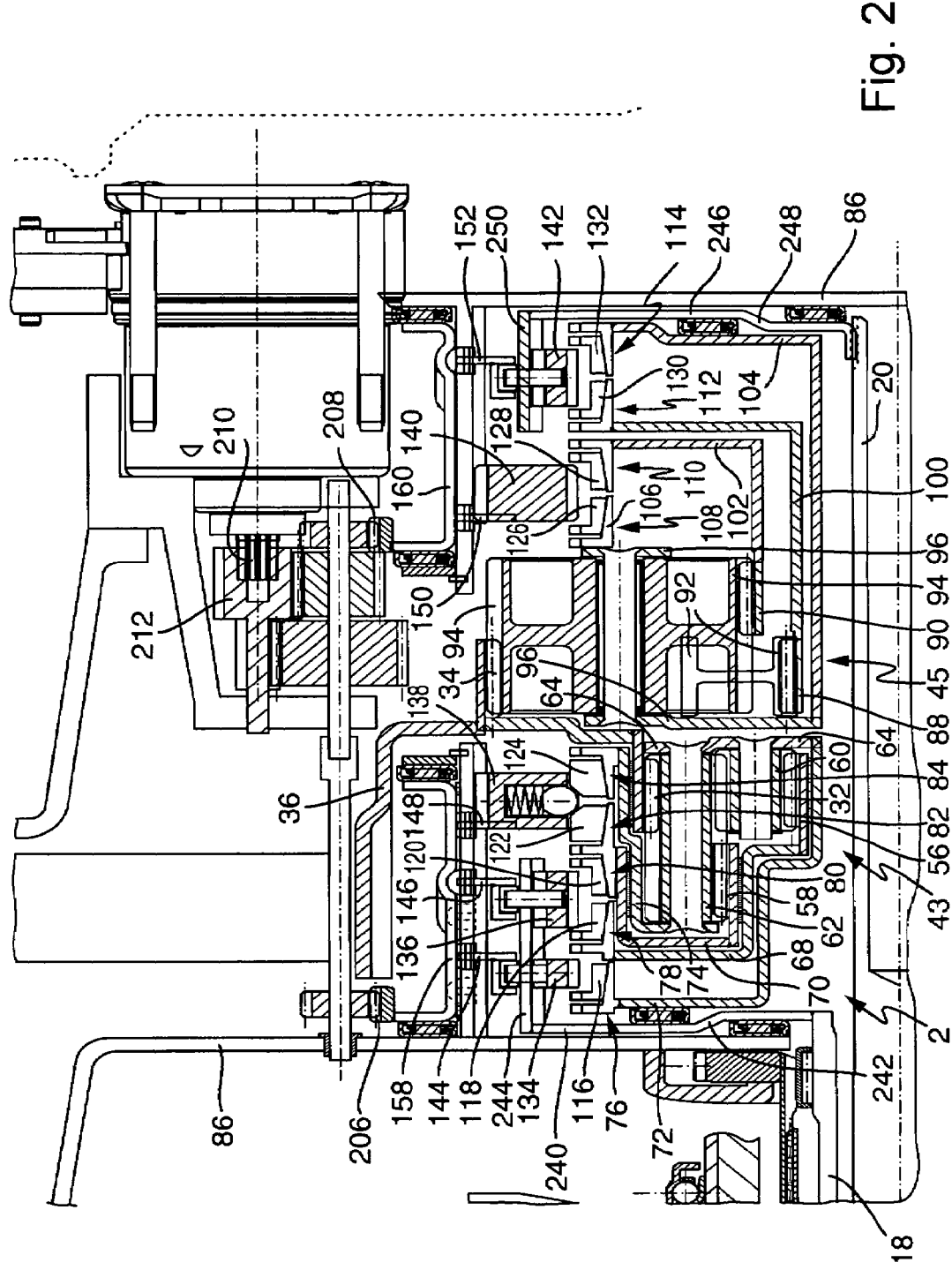
FIG. 2 shows an enlarged excerpt from FIG. 1 in the area of the planetary gears and the control unit.

FIG. 2 shows an enlarged excerpt from FIG. 1 in the area of the first subgear 14 as well as the second subgear 16. FIG. 2 also shows the control unit 50 for the actuation of these two subgears in an enlarged gear.

The first planetary gear 28 has a small sun wheel 56 as well as a big sun wheel 58, short planet wheels 60, long planet wheels 62, a planet carrier 64 and a ring gear 32. One each is shown in FIG. 1 or in FIG. 2 of the short planet wheel 60 as well as of the long planet wheels 62. Of course, several of these wheels are provided in a manner distributed over the circumference, such as, for example, in each case three, or in each case four, or in each case five.

Small sun wheel 56 has a prolongation 68. Furthermore, the large sun wheel 58 has a prolongation 70. Moreover, planet carrier 64 has a first prolongation 72 as well as a second prolongation 74.

Speed clutches 76, 78, 80, 82, 84 are provided furthermore for the engagement and disengagement of the speeds of the first subgear 14 or the planetary gear 28. These speed clutches 76, 78, 80, 82, 84 are preferably made as form-locking clutches, such as, for example, claw clutches or clutches made up of gear rims. The first main gear shaft 18 can be coupled in a splined manner with one or two of the prolongations 68, 70, 72 by means of a part 76, 78, 80 of these speed clutches 76, 78, 80, 82, 84. By means of another part 82, 84 of these speed clutches 76, 78, 80, 82, 84, a particular one among prolongations 70, 74 can be fixed with respect to housing 86. The design according to FIG. 2 provides that in each case two or precisely two of these—in this case, by way of example, five—speed clutches 76, 78, 80, 82, 84 must be engaged in a certain relationship so that a corresponding speed can be set.

In the design according to FIG. 2, in which in the first subgear 14 or in the first planetary gear 28 the even speeds as well as the reverse speed can be switched, it is provided, in particular, that the second gear be engaged when, by engaging the speed clutch 78, the first main gear shaft 18 is connected in a splined manner with a small sun wheel 56 and the planet carrier 64 is fixed with respect to housing 86 by engaging speed clutch 84. This design furthermore provides that the fourth speed is engaged when, as a result of the engagement of speed clutch 76, the first main gear shaft 18 is connected in a splined manner with planet carrier 64 due to the engagement of speed clutch 78 so that the first main gear shaft 18 is connected in a splined manner with a small sun wheel 56. In the design according to FIG. 2, it is furthermore provided that the sixth speed be engaged when, as a result of the engagement of speed clutch 76, the first main gear shaft 18 is connected in a splined manner with planet carrier 64 and when, due to the engagement of speed clutch 82, the large sun wheel 58 is fixed with respect to housing 86. Furthermore, in the design according to FIG. 2, it is provided that the reverse speed be engaged when, as a result of the engagement of the speed clutch 80, the first main gear shaft 18 is connected in a splined manner with the large sun wheel 58 and when planet carrier 64 is fixed with respect to housing 86 as a result of the engagement of speed clutch 84.

The second subgear 16 or the second planetary gear 30 has a small sun wheel 88 as well as a large sun wheel 90, short planet wheels 92, long planet wheels 94, a planet carrier 96 as well as a ring gear 34. Among the short planet wheels 92 as well as the long planet wheels 94, several—for example, three or four or five—are provided in a manner distributed over the circumference. Planet carrier 96 is a common planet carrier for the short planet wheels 92 as well as the long planet wheels 94.

Small sun wheel 88 has a prolongation 100 and large sun wheel 90 has a prolongation 102. Furthermore, planet carrier 96 has a first prolongation 104 as well as a second prolongation 106. As prolongation 106 shows, this prolongation 106—and that applies basically also to the remaining prolongations—can be a part of a speed clutch or a synchronization device. But provision can also be made, as shown, for example, by prolongations 102, 100, 68, 70, 72, 74, that these prolongations display wall segments that extend radially as well as wall segments that essentially extend axially. In particular, a prolongation or several prolongations—as shown in FIG. 2—can essentially have the shape of a cup and/or can be shaped in a rotationally symmetrical manner, specifically and especially with a breach that is arranged centrally in the middle.

Several speed clutches 108, 110, 112, 114 are provided for the purpose of engaging and disengaging speeds of the second subgear 16 or the second planetary gear 30.

By means of a part of these speed clutches 108, 110, 112, 114, which in this case are speed clutches 112, 114, the second main gear shaft 20 can be connected in a splined manner with one of the particular associated prolongations, in this case, prolongation 100 or prolongation 104. By means of another part of these speed clutches, in this case by means of speed clutches 108 or 110, predetermined prolongations—in this case, the (alternative) prolongations 102 or 106—can be fixed in each case with respect to housing 86. This takes place here particularly in such a way that by means of speed clutch 108, planet carrier 96 can be fixed with respect to the housing, and that by means of speed clutch 110, the large sun wheel 90 can be fixed with respect to the housing. The second main gear shaft 20 can be connected in a splined manner with the small sun wheel 88 by means of speed clutch 112. A second main gear shaft 20 can be connected in a splined manner with the planet carrier 96 by means of speed clutch 114. In this connection, it might, of course, be mentioned that it can also be provided alternatively that, instead of the splined clutch of the second main gear shaft 20 with a particular mentioned part of the second planetary gear 30 by means of the particular mentioned speed clutch 112 or 114, provision can also be made that "merely" one torque connection be generated; for example, it can be provided that an additional gear wheel step is present between the second main gear shaft and the particular mentioned part of the planetary gear 30. This also applies with regard to the splined connections, which—as mentioned earlier—can be generated by means of speed clutches 76, 78, 80 between a particular part of the first planetary gear 28 and the first main gear shaft 18; these connections can also be alternatively "only" torque connections.

The odd speeds of the gear can be engaged by means of the second subgear 16 or by means of the second planetary gear 30. Provision is made here that precisely two speed clutches must be engaged for the purpose of engaging each of the odd speeds.

Here is how this works: The first speed is engaged when, due to the engagement of the speed clutch 108, the planet carrier 96 is fixed with respect to housing 86, and when, due to the engagement of speed clutch 112, the second main gear shaft 20 is connected in a splined manner with the small sun wheel 88. In the design according to FIG. 2, the third speed is engaged when, due to the engagement of speed clutch 110, the large sun wheel 90 is fixed with respect to housing 86 and when, due to the engagement of speed clutch 112, the second main gear shaft 20 is connected with the small sun wheel 88 in a splined manner. The fifth gear is engaged in the design according to FIG. 2 when, due to the engagement of speed clutch 110, the large sun wheel 90 is fixed with respect to housing 86 and when, due to the engagement of speed clutch 114, the second main gear shaft 20 is connected in a splined manner with planet carrier 96.

As noted earlier, it is provided in the design according to FIG. 2 that, for the purpose of engaging an even speed or the reverse speed in the third subgear 14 or in the first planetary gear 28, one must engage precisely two speed clutches and to engage an uneven speed in the second subgear 16 or in the second planetary gear 30, precisely two speed clutches must be engaged.

With respect to the second planetary gear 30, a speed clutch 108 is provided, which can be engaged only if it is properly set when the smallest (odd) speed is to be set (in this case, the first speed) and a speed clutch 114 is provided, which is engaged only when the largest (odd) speed, which in this case is the fifth speed, is to be set. The remaining speed clutches 110, 112, which are associated with the second planetary gear 30, are in each case associated with two speeds so that the latter are engaged when one of these speeds or the other of these speeds is to be set. The combination of the speed clutches that are engaged for the purpose of setting a speed here, of course, differs for each of these odd speeds. With regard to these remaining speed clutches, in other words, those that are not associated with the highest and not with the lowest (odd) speed, it is provided that the same speed clutch be associated with successive speeds. In these exemplary embodiments, speed 112 is associated with the successive odd speeds "1" and "3" and speed clutch is associated with the successive speeds "3" and "5."

In a corresponding manner with respect to the first planetary gear 28, there is provided a speed clutch 80, which is engaged only when the reverse gear (R) is to be used; a speed clutch 82 is provided and it is engaged only when the highest (even) speed—in this case, the sixth speed—is to be used. The remaining speed clutches 76, 78, 84 of the first planetary gear 28 are in each case associated with two speeds. Here it is provided that a common speed clutch be associated with the successive speeds and, in this regard, the reverse speed is referred to as a speed located below the second speed.

As with reference to the second planetary gear 30 and with respect to the first planetary gear 28, the combination of the two engaged speed clutches will differ for each of the speeds that can be set. The above will be clarified with regard to the speed clutches of the first planetary gear 28 as well as the second planetary gear 30 also by the speed designations that are entered in the vicinity of the speed clutches located there.

In particular, it is provided that a speed can be engaged simultaneously in the first planetary gear 28 and in the second planetary gear 30. It is provided here, in particular, that only one speed can be engaged simultaneously in each of these two planetary gears 28, 30.

Speed clutches 76, 78, 80, 82, 84, 108, 110, 112, 114 are synchronized speed clutches or speed clutches that are provided with synchronization devices. These synchronization devices have a synchronization ring 116, 118, 120, 122, 124, 126, 128, 130, 132; these synchronization rings are associated with the corresponding speed clutches in accordance with the arrangement that can be seen in FIG. 2.

The speed clutches furthermore have sliding couplings or sliding couplings 134, 136, 138, 140, 142 are associated with the speed clutches. Here is how that works: Sliding coupling 134 is associated with speed clutch 76, sliding coupling 136 is associated with speed clutches 78 and 80, sliding coupling 138 is associated with speed clutches 82 and 84, sliding coupling 140 is associated with speed clutches 108 and 110 and sliding coupling 142 is associated with speed clutches 112 and 114. In particular, it is provided that the particular synchronization hub, which, in particular, is provided separately in known synchronization devices, and a particular sliding coupling be united or combined in that or whereby the torque is applied or introduced from the outside or from outside of the sliding coupling(s). This torque, in particular, is the torque that is introduced into the synchronization device from the driving side. The arrest(s) for presynchronization are designed in a simplified manner when compared to the known jackshaft synchronization devices.

Provision can be made that the speed clutches 76, 78, 80, 82, 84 be actuated by means of forced guide. This kind of forced guide, for example, can be a part of the control unit 50 or can be arranged on the interface between this control unit 50 and speed clutches 76, 78, 80, 82, and 84. In particular, it can be provided here that the forced guide acts upon sliding couplings 134, 136, and 138. This action can be such that the sliding couplings in each case are so actuated that at a maximum or, until a predetermined speed has been set, precisely two sliding couplings are so switched that the pertinent speed clutch will be engaged. Furthermore, it can be provided here that during the corresponding actuation processes, the forced guide be used in order to move the sliding couplings—that are not associated with the particular speed to be set—into a neutral position, in other words, they are completely disengaged. Correspondingly, a forced guide can be provided for the actuation of speed clutches 108, 110, 112, 114 of the second planetary gear 30. This forced guide likewise, for example, can be so designed as was mentioned earlier with regard to the forced guide for the speed clutches of the first planetary gear 28. It is particularly preferred here that the forced guides for the first planetary gear 28 and the second planetary gear 30 be independent of each other.

In the design according to FIG. 2, sliding couplings 134, 136, 138, 140, 142, in each case have a pin or a guide pin 144, 146, 148, 150, 152 or they are connected with such a pin. These pins 144, 146, 148, 150, 152, for example, can have a head and/or can be spring-loaded. For example, it can also be provided that the head be spring-loaded with respect to the remaining pin. The head or the pin or a pin end, for example, can be made in the manner of a freewheel element or can cooperate in the manner of a freewheel, at least in certain positions with a part with which it can cooperate or in which it can engage. This part, for example, can be a camshaft controller; such a camshaft controller will be covered in greater detail below.

The exemplary embodiment according to FIG. 2 provides a first camshaft controller 158 for the actuation of the or of all speed clutches or of the sliding couplings of the first planetary gear 28 and a second camshaft controller 160 for the actuation of the or of all speed clutches or of the sliding couplings of the second planetary gear 30.

The camshaft controllers 158, 160, in other words, are made as separate parts in this particular exemplary embodiment. As an alternative, of course, they can be made as a common part. In the exemplary embodiment according to FIG. 2, it makes good sense, especially for reasons of structural space, to make these two camshaft controllers 158, 160 separately because the prolongation 36—located there—of the ring gears 32, 34 can extend axially between these camshaft rollers 158, 160 or can extend radially outward there. For a different structural space arrangement, whereby, also in case of a different structural space arrangement, in other words, especially when prolongation 36 is not guided in the manner mentioned, it can be provided that there be two separate camshaft controllers 158, 160 for the two planetary gears 28, 30. For example, it can also be provided that the—especially common—drives, such as an electric motor of these two camshaft controllers 158, 160, can be uncoupled from them in each case, whereby, for example, one can provide a corresponding clutch. Such a clutch or a similar part, in particular, can provide a possibility of simultaneously actuating only one of the camshaft controllers. There may also be a gearshift possibility that would be so arranged that, alternatively, one or the other of the camshaft controllers 158, 160 can be actuated by means of the drive or that both of them can be actuated simultaneously.

Camshaft controllers 158, 160 are made as hollow parts and have a profiling on their radially internal side. This profiling is created in this case by a plurality of grooves 162, 164, 166, 168, 170, 172, 174, 176, 178, 180, 182, 184, 186, 188, 190, 192, 194, 196 or has such grooves. Grooves 162 to 184 are distributed in several axially spaced rows over the internal circumference of camshaft controller 158. Grooves 186 to 196 are distributed in several rows over the internal circumference of camshaft controller 160 in several axially spaced rows.

Figure 3:
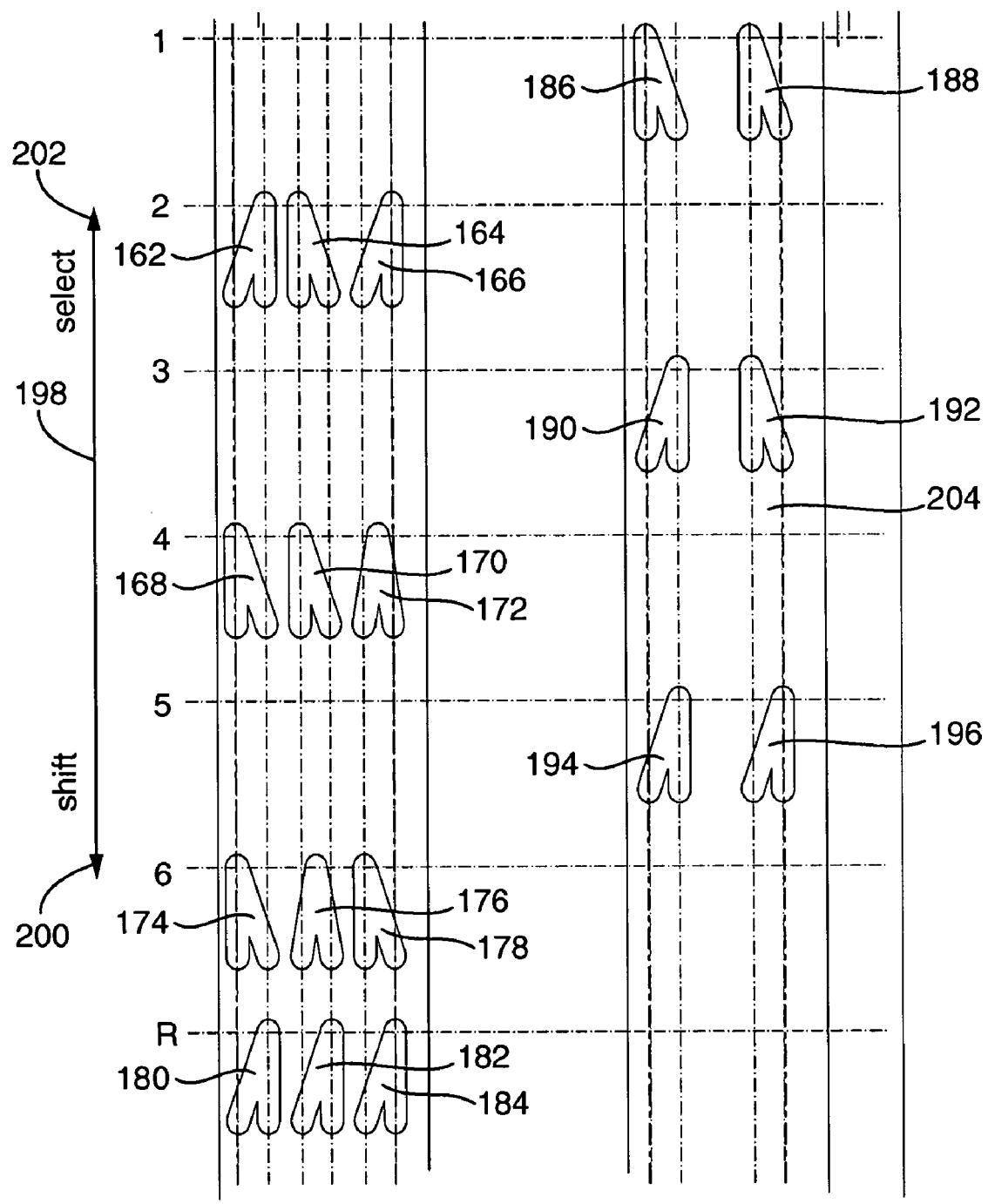
FIG. 3 is a diagram, illustrating the groove profile on the inside surface (over 180° of the circumferential direction) of the first and of the second camshaft controllers from FIG. 2 in the unrolled form.

The exemplary arrangement of such grooves, shown here, is presented by way of example in FIG. 3; on the left for camshaft controller 158 and on the right for camshaft controller 160, one can see here the unwound inside surface or the half inside surface extending over 180° with the grooves of the two camshaft controllers 158, 160.

As one can see in this figure, the grooves in this exemplary embodiment are so shaped that they have two straight segments that blend into each other at one end. As one can gather from FIG. 3, the grooves here create a kind of triangle, where the direct connection of two corners of this triangle is interrupted, in other words, there are no grooves there. The grooves, in other words, are so arranged that they essentially form a triangle where one leg does not exist or does not have a groove.

As one can gather from FIG. 3, three different groove types or groove shapes are provided here. The first groove type (see, for example, reference number 176) is so shaped that the two groove segments formed by the two straight segments, which hereafter will be referred to as legs, in each case extend in a manner inclined toward the circumferential direction or pure circumferential direction (without axial component) and abut each other at one end. They are essentially arranged in this case in mirror-symmetry fashion with respect to the mentioned circumferential direction. A second groove type is so shaped that one leg essentially extends in the circumferential direction and that the second leg, which, with one of its ends touching the end of the first leg, extends in a manner inclined toward the circumferential direction is specifically placed in such a way that it shoots off in a first axial direction (see, for example, reference number 164). The third type of these grooves is essentially shaped in mirror-symmetry fashion with regard to the second type of these grooves, specifically with regard to a plane located perpendicularly to the axis of the camshaft controller.

As one can see in the scale on the left illustration edge in FIG. 3, which indicates the speeds, one groove each is provided for engaging each speed for each of the pins 144, 146, 148 or for each of the sliding couplings 134, 136, 138, whereby these couplings are located axially next to each other, in other words, they are associated with differently axially spaced rows. The same applies accordingly to the grooves of the second camshaft controller 160.

In this exemplary embodiment, in other words, the grooves are not only so arranged that they form rows (looking at it in the circumferential direction), where these rows are axially spaced apart from each other, but also in such a way that they form rows in the axial direction, which are spaced apart from each other in the circumferential direction. That is the case in both of the camshaft controllers 158, 160, whereby, of course, the number of grooves will be different. This is so arranged that each of the groove rows extending in the axial direction of the first camshaft controller 158 will, in terms of number, display as many grooves as there are sliding couplings or guide pins for the engagement or disengagement of speeds of the first planetary gear 28. In the exemplary embodiment, there are three sliding couplings 134, 136, 138 or three guide pins 144, 146, 148; therefore, consequently, each of these groove rows, extending in the axial direction, will have three grooves. It should be noted, however, that a guide pin can be associated with each of the sliding couplings 134, 136, 138 or 140, 142; but for each of the slide couplings, one can also provide several guide pins that are spaced apart, especially with relation to the circumferential direction of the corresponding camshaft controller.

The same applies accordingly also to the number of grooves that exist in each of the groove rows extending in the axial direction of the second camshaft controller 160. Two sliding couplings 140, 142 are located there; therefore, each of the groove rows extending in the axial direction of the second camshaft controller 160 will have two grooves.

The groove rows extending in the circumferential direction of the camshaft controller have in each case as many grooves as beads can be set via the corresponding camshaft controller 158 or 160 or in the corresponding planetary gear or an integral multiple of this number of speeds. By means of the first camshaft controller 158 or in the first planetary gear 28, one can set four speeds, that is to say, the second speed, the fourth speed and the reverse speed; therefore, each of the groove rows extending in the circumferential direction will have four grooves there or a multiple thereof, such as, for example, eight or twelve. The same applies accordingly also to the number of grooves that exist in the groove rows of the second camshaft controller extending in the circumferential direction. Three speeds can be set via the second camshaft controller 160 or in the second planetary gear 30 according to the exemplary embodiment, that is to say, the first speed, the third speed and the fifth speed; therefore, each of the groove rows extending in the circumferential direction will have three grooves or a multiple of three, such as, for example, six or nine.

Earlier it was explained especially that the cam or groove pattern shown in FIG. 3 is provided on the inside surface of the particular camshaft controller 158 or 160. But one can also provide that the pattern, shown in FIG. 3, be provided several times on the inside surface of camshaft controller 158 or 160. According to FIG. 2, this is so that this cam or groove pattern, shown in FIG. 3, extends twice on the inside surface of the camshaft controller 158 or 160. Here it is provided that the pattern, shown in FIG. 3, extends doubly over essentially 180° of the inside surface of camshaft controller 158 or 160. This means, in particular, that the number of grooves that exist in the particular groove rows extending in the circumferential direction is twice as large as was mentioned earlier, something that was indicated already above by the term "multiple." But one can also provide that the corresponding pattern be provided there more than twice, for example, three times or four times or five times. This makes it possible, for example, to perform selection processes faster. In this case, corresponding to each speed, there are provided several groove rows, for example, two or three, that extend in the axial direction also over the circumference.

It is provided that the speeds can be switched in each of the two particular planetary gears 28 or 30 or wheel sets 43 or 45 without influencing the switching of the speeds or the speeds in the other planetary gear or wheel sets 45 or 43.

It is provided that the first camshaft controller 158, as well as the second camshaft controller 160, in each case are positioned in an axially fixed and rotationally movable manner. A first orientation of the direction of rotation is provided for the switching operation and a second orientation of the direction of rotation is provided for the selective action. FIG. 3 shows a double arrow 198 where the top of the arrow 200 indicates the direction of movement for "switching," while the arrow tip 202 indicates the direction of movement for "selection."

The first camshaft controller 158 or the second camshaft controller 160 can be driven by means of electric motor 52 optionally in this direction of selection 202 or in this switching direction 200. To select a speed in one of the two planetary gears 28, 30, one can first of all drive the corresponding camshaft controller in the direction of selection until the corresponding guide pin or the corresponding guide pins have assumed an essentially predetermined position. Subsequently, the camshaft controller can be driven in the opposite direction, in other words, in the switching direction, so that the guide pins whose couplings are to be shifted, will cooperate correspondingly with a groove or with cams. This is illustrated in FIG. 3 using the example of groove 192 or of the third speed. There one can first of all drive the second camshaft controller 160 in the direction of selection until such time as guide pin 152 is essentially in area 204. Subsequently, the driving direction of the second camshaft controller 160 can be changed (opposite direction) so that the camshaft controller will turn in the switching direction and so that guide pin 152 will engage groove 192 and—especially because the second camshaft controller 160 is arranged in an axially fixed manner—will be so moved there that the switching bushing or sliding coupling 142 will be so moved—to the extent necessary—or will be so moved in the axial direction—to the extent necessary—as is required for engaging the desired speed (see reference number 203 in FIG. 3). It is particularly provided here that guide pin 150 simultaneously also cooperate accordingly with groove 190.

To the extent that a corresponding switching or sliding coupling already has assumed its required position for the engagement of the particular speed—something that here especially in the case of the first planetary gear 28 can also correspond to a neutral position—the corresponding switching or sliding coupling is not moved by means of the corresponding groove.

A locking action can, for example, be implemented here in that the groove or cam profile with each coupling or each sliding coupling will end only in the desired position for the corresponding speed.

Figure 4:
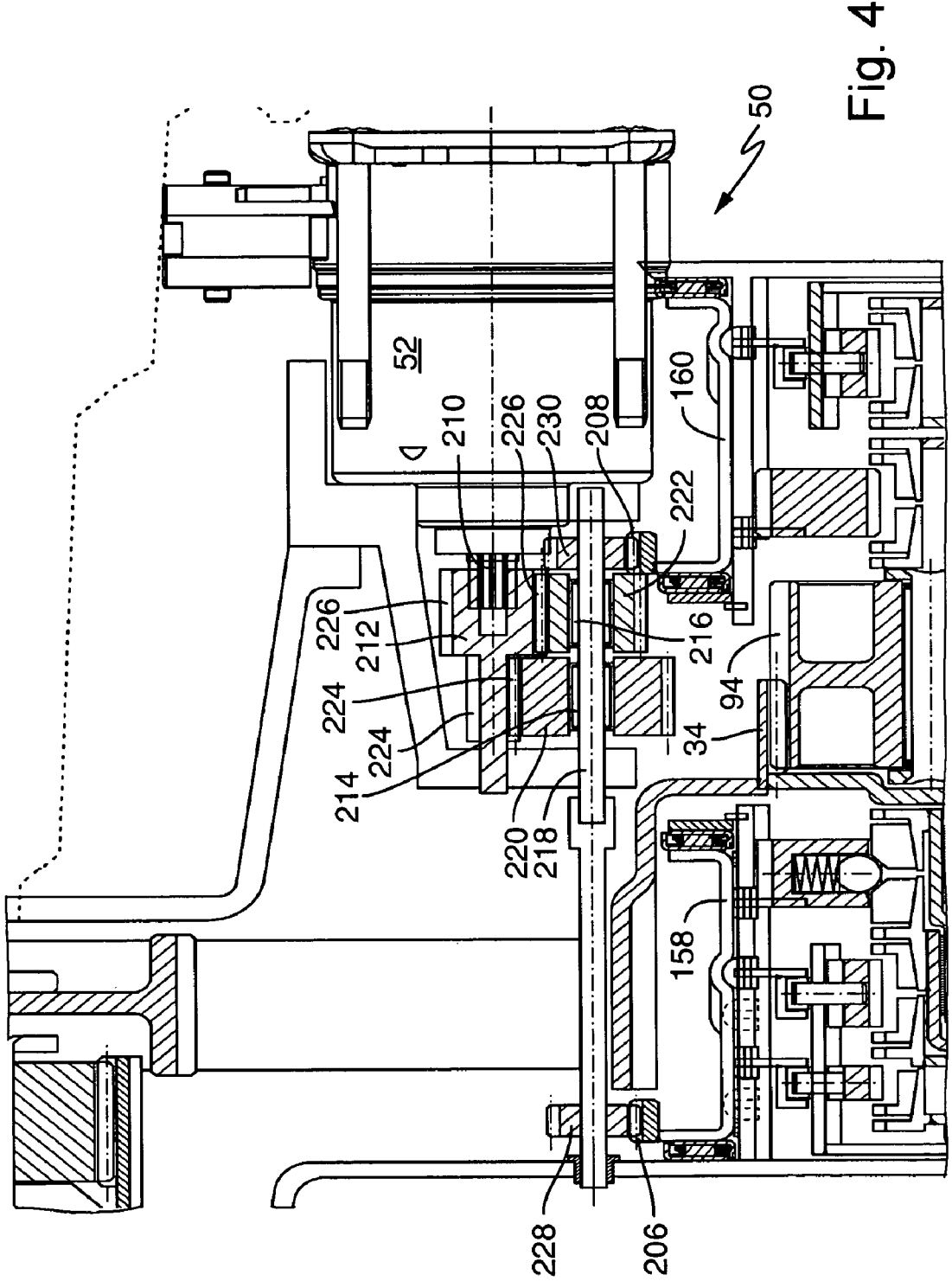
FIG. 4 shows an enlarged excerpt from FIG. 1 in the area of the control unit.

The camshaft controllers 158, 160 have a toothing 206 or 208, which in this case is made as an outside toothing. The particular camshaft controller 158 or 160 can be driven by means of electric motor 52 via this toothing 206 or 208. This, for example, is arranged in such a way that the electric motor 52 has an electric motor output shaft 210. The electric motor output shaft 210 has a toothed shaft 212 that basically, however, can also be made integrally with the electric motor output shaft 210. Unilaterally acting clutches or freewheels are provided between the electric motor output shaft 210 and the camshaft controllers 158 or 160. It is provided here, in particular, that a first unilaterally acting freewheel 214 is connected parallel to a second unilaterally acting freewheel 216 (see FIG. 4). One freewheel 214 of these two freewheels here works in the opposite direction when compared to the other freewheel 216 of these two freewheels.

A switching selection shaft 218 (see FIG. 4) is provided on which there is a first gear wheel 220 as well as a second gear wheel 222. The first freewheel 214 here is arranged between this first gear wheel 220 and this switching selection shaft 218, and the second freewheel 216 is arranged here between this second gear wheel 222 and this switching selection shaft 218. The first gear wheel 220 engages a first countertoothing 224 and the second gear wheel 222 engages a second countertoothing 226 (see FIG. 4).

The first countertoothing 224 and the second countertoothing 226 here are a part of the toothed shaft 212. This can be arranged in such a manner that the first countertoothing 224 and the second countertoothing 226 are made integrally with each other. But it can also be provided that these countertoothings 224, 226 are made as separate parts. For example, it can also be provided that they are made as separate gear wheels that sit on the electric motor output shaft 210.

A unilaterally acting freewheel, the first freewheel 214, is provided in order to transmit a torque when electric motor 52 is driven in the switching direction. This first freewheel 214 does not transmit a torque when electric motor 52 is driven in the selection direction. The second unilaterally acting freewheel 216 transmits a torque when electric motor 52 is driven in the selection direction and it does not transmit a torque when electric motor 52 is driven in the switching direction.

The gear ratio between the first countertoothing 224 and the second gear wheel 220 deviates from the gear ratio between the second countertoothing 226 and the second gear wheel 222. In cooperation with freewheels 214, 216, one can make sure in this way that the total gear ratio between electric motor 52 or the electric motor output shaft 210 and the camshaft controller 158 or 160 for movement in the selection direction can be chosen in a manner different than for movement in the switching direction. The exemplary embodiment provides, for example, that the gear ratio of the gear ratio step 224/220 would essentially correspond to "60" and that the gear ratio 226/222 would essentially correspond to "15"; the gear ratios, however, can also be chosen differently.

Two gear wheels 228, 230 are arranged on the switching selection shaft 218 or a shaft connected herewith. One gear wheel 228 of these gear wheels 228, 230 engages the toothing 206, which is provided on the first camshaft controller 158. The other gear wheel 230 engages toothing 208, which is provided on the second camshaft controller 160.

The control unit 50, in particular, displays electric motor 52 as well as the camshaft controllers 158, 160 and the preferably mechanical transmission segment or transmission parts that are arranged between this electric motor 52 and these camshaft controllers 158, 160. Control unit 50 here preferably, in other words, has an electromechanical actuator or is made as an electromechanical actuator. In this connection, it might be noted that one can also provide a differently designed control unit, such as, for example, a hydrostatic or hydraulic control unit or a control unit that has a "standard" camshaft controller of the already known type. The control unit can also have gearshift forks. In such designs, one can especially also provide several electric motors or other drives.

Of course, a design with precisely one motor is particularly preferred because that represents simplification.

According to the invention, it is, however, provided in a particularly preferred manner that one use precisely one electric motor for driving in the switching direction and the selection direction, whereby it is provided especially that the selection and switching direction of the first planetary gear 28 and of the second planetary gear 30 can be driven precisely by means of this one electric motor.

Guide pins 144, 146, 148, 150, 152, or the cooperation of those pins with the grooves in the camshaft controllers, are particularly so designed that the guide pins upon a rotation of the camshaft controller 158 or 160 in the selection direction will migrate out of the grooves and, upon a rotation in the switching direction, will engage those grooves. They can, for example, have a swingable head that is so profiled that it will support the action of engagement and disengagement. But they can also have a corresponding profiling without having any such head. Furthermore, they can be spring-loaded, for example.

A preferred design is provided in that two guide pins at a time are provided for each switching bushing or switching housing or sliding coupling. They, for example, can be arranged offset with respect to each other by 180° (in the circumferential direction).

Figure 5:
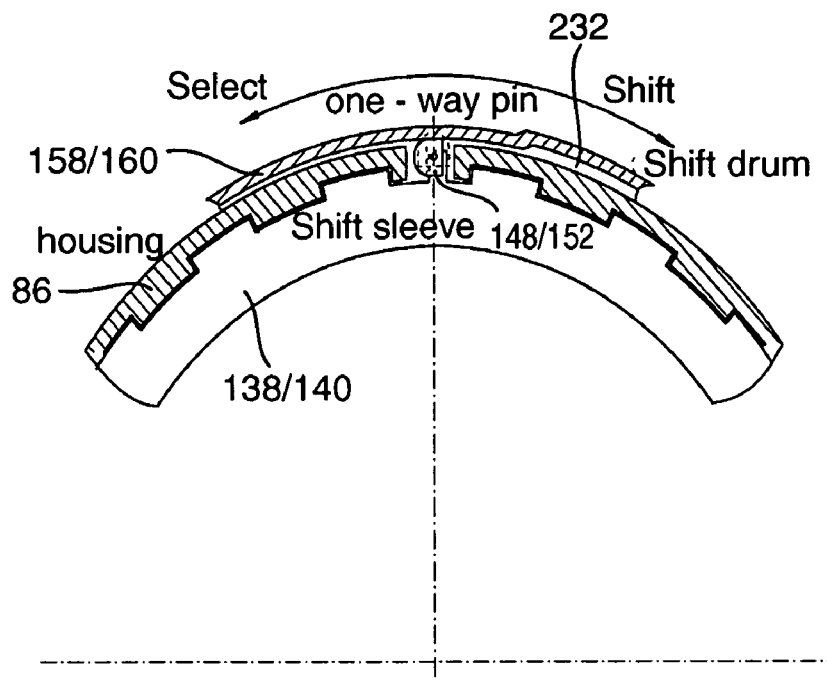
FIG. 5 is a profile view from FIG. 2.

An example of such a design where one guide coupling can be connected in a splined manner with the housing is shown in FIG. 5. Sliding coupling 138 or 140 is connected there in a form-locking manner with housing 86 so that the sliding coupling 138 or 140 will be arranged axially shiftable, although splined in the housing. A guide pin 148 or 152 protrudes radially outward from sliding coupling 138 or 142. Guide pins 148, 152 are made as unilaterally acting guide pins. In a preferred design, by the way, that also applies to guide pins 144, 146, 150. This is arranged in such a way that the guide pin essentially does not assume any guide function during a movement of the camshaft controller 158 or 160 in the selection direction and, during a movement in the switching direction, it engages a corresponding groove on the camshaft controller and can assume a corresponding guide function. Such a guide is provided here schematically with the reference number 232, whereby this groove basically can be any one of the grooves from FIG. 3. It should be noted, however, that, looking at the design according to FIG. 5, the housing 86 is connected in a splined manner with sliding coupling 138 or 140 so that groove 232 from FIG. 5, strictly speaking, can be one of the grooves 166, 172, 178, 184, 186, 190 or 194 from FIG. 3. But it should be noted that a corresponding design can be used for the remaining sliding couplings that can be connected in a splined manner with the first main gear shaft 18 or the second main gear shaft 20, whereby the housing is replaced there by a segment of the corresponding main gear shaft 18 or 20 or a prolongation that is arranged in a fixed manner upon that main gear shaft 18 or 20.

Figure 6:
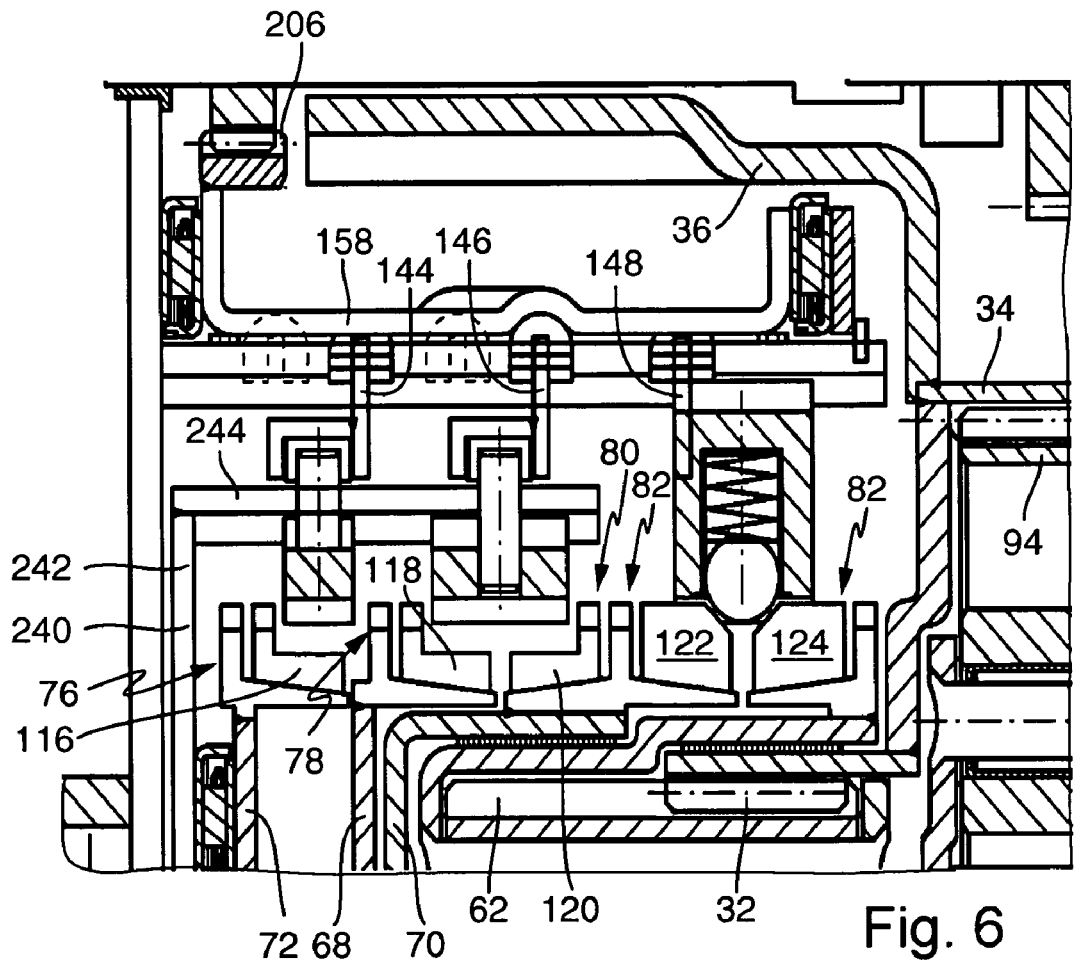
FIG. 6 is an enlarged excerpt from FIG. 1 or FIG. 2 in the area of the synchronization devices.

As one can readily see in FIG. 2, guide pins 144, 146, 152 for sliding couplings 134, 136, 142 by means of which clutches to the main gear shaft 18 or 20 can be generated are arranged or made there, of course, in a deviating fashion. It is especially provided there that the guide pins with respect to the associated sliding couplings 134, 136, 142 be so arranged that a relative rotation possibility will be created and so that the corresponding guide pin 144, 146, 152 will essentially be connected axially with the corresponding sliding coupling 134, 136, 142. The clutch is so arranged here that the particular guide pin has a forking prolongation in which the associated sliding coupling 134, 136, and 142 is trapped axially. This can also be seen clearly in the enlarged excerpt from FIG. 1, which is shown in FIG. 6. FIG. 6 especially shows an enlarged picture of the synchronization device.

As one can gather from FIG. 6, the particular guide pin 144, 146, 152 by means of which one can generate a splined connection between a main gear shaft 18 or 20 and a part of the planetary gear 28 or 20—shown in FIG. 6 for the first main gear shaft 18—has a segment that grasps around a projection or ring or the like in the sliding coupling; specifically, it grasps around it in an axial fashion. Rotational mobility is allowed here in the circumferential direction.

Area 240 with wall segment 242 forms an input of the (first) clutch 24 for the even speeds. Wall segment 242, by way of example, is fashioned approximately in the form of a disc or extends essentially in the radial direction. Wall segment 242 is molded upon the first main gear shaft 18 or is a part of it. In cooperation with wall segment 244, which in this case has an essentially hollow cylindrical shape and which is firmly connected with wall segment 242, wall segment 242 forms an essentially cup-shaped unit in which there is a central passage opening in the center in the bottom formed by wall segment 242, whereby this wall segment 242 in the area of this passage opening is molded upon the first main gear shaft 18, forming an integral part.

Area 246 with wall segment 248 forms an input of the (second) clutch 26 for the odd speeds. Wall segment 248, here by way of example, has an approximately disc-shaped form or extends essentially in the radial direction. Wall segment 248 is molded upon the second main gear shaft 20 or is a part of it. In cooperation with wall segment 250, which in this case essentially has a hollow cylindrical shape and which is firmly connected with wall segment 248, wall segment 248 forms an essentially cup-shaped unit in which there is a central passage opening in the middle of the bottom formed by wall segment 248, whereby this wall segment 248 in the area of this passage opening is molded upon the second main gear shaft 20, forming an integral part.

From FIG. 6, one can also readily gather that the synchronization hub or the synchronization unit and the particular sliding coupling can be combined or assembled in that the torque is applied upon the sliding coupling from the outside. Furthermore, FIG. 6 clearly shows that the arrest(s) for presynchronization are designed in a simplified manner when compared to the known auxiliary shaft synchronization devices.

Figure 7:
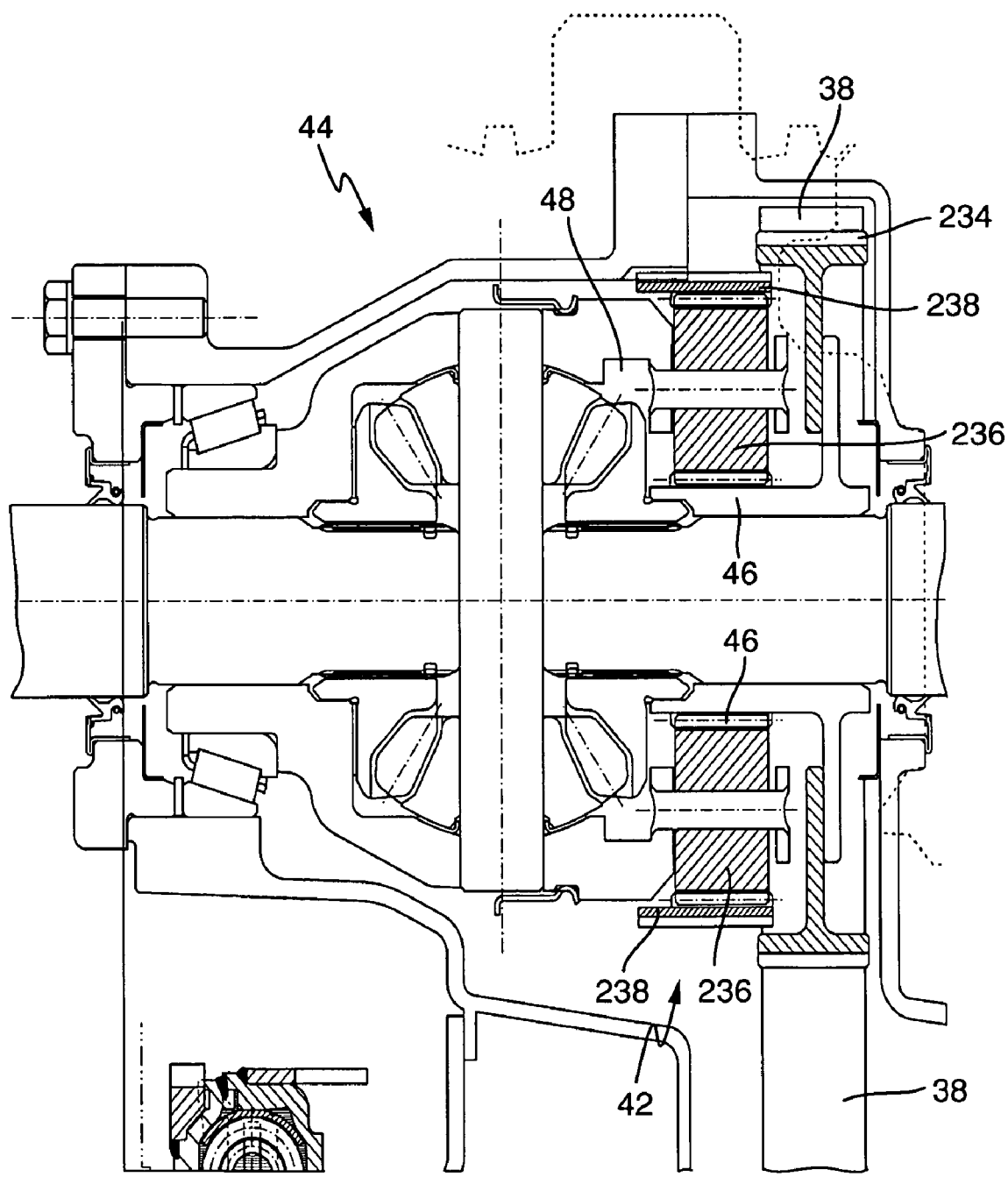
FIG. 7 is an enlarged excerpt from FIG. 1 in the area of the differential.

FIG. 7 shows another enlarged excerpt from FIG. 1. FIG. 7 especially shows an enlarged image of the differential 44. Here one can easily see that the transmission chain 38,— which, although this is not illustrated, engages a toothing of prolongation 36—transmits a torque from that prolongation 36 or from the particularly planetary gear 28 or 30 to the sun wheel 46 of wheel set 42. This is so arranged here that sun wheel 46 is firmly connected with gear wheel 234 in which transmission chain 38 engages. Wheel set 42 is made in the form of a planetary gear or has a planetary gear, which again has sun wheel 46, several planet wheels engaging this sun wheel 46 as well as a toothing 238 in which planet wheels 236 engage. Several of these planet wheels 236 are provided in a manner distributed over the circumference, such as, for example, three or four or five or also a different number.

Compared to conventional "ring-and-pinion" designs or pinion-and-ring gear sets, the design shown in FIG. 7 saves space due to the smaller space requirement of the ring gear and makes it possible to use smaller bearings. Embodiments with a design according to FIG. 7, for example, can be built into transaxle vehicles. In the design according to FIG. 7, one can especially provide that the torque be "reflected" on the ring gear and be passed on by planet carrier 48 in the direction of differential 44 or that ring gear 238 be arranged fixedly in the housing and that planet carrier 48 form the output connected with differential 44.

A transmission shaft can also be employed as an alternative to the arrangement according to FIG. 7.

Figure 8A:
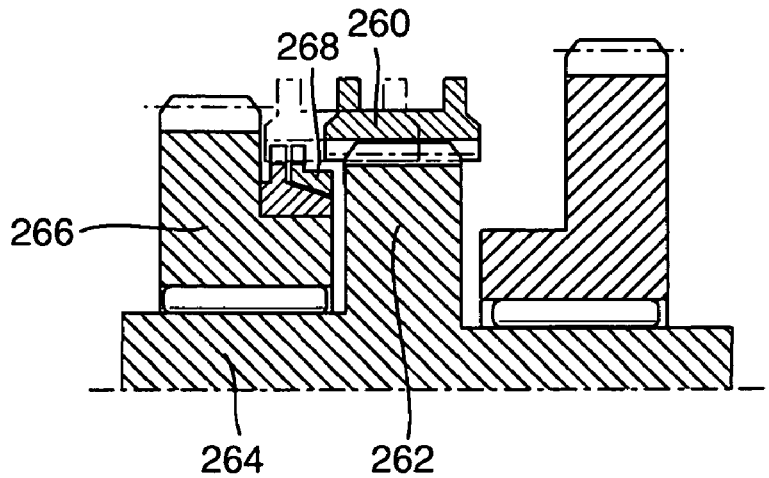
FIG. 8a is a diagram illustrating a "standard synchronization device" by way of example.
Figure 8B:
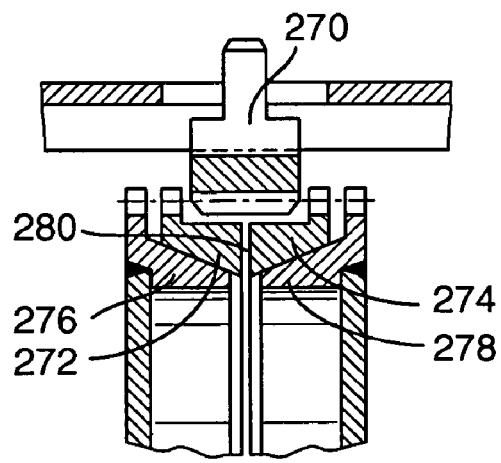
FIG. 8b shows an invention-based synchronization device for a planetary gear that, for example, can exist also in the design according to FIGS. 1 to 7 or according to FIG. 9 or according to FIG. 10 for the switching and/or synchronization of the sun wheels and/or the planet carriers located there.
Figure 8C:
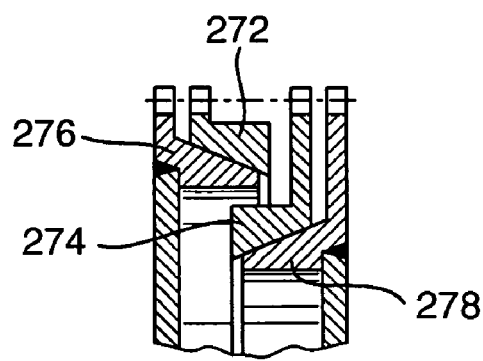
FIG. 8c shows another invention-based synchronization device for a planetary gear, which, for example, can exist also in the design according to FIGS. 1 to 7 or according to FIG. 9 or according to FIG. 10 for the switching and/or synchronization of the sun wheels and/or the planet carriers located there, whereby it is also preferred that in this design, the synchronization devices are partly fashioned according to the design shown in FIG. 8c and partly according to the design in FIG. 8b.

FIGS. 8a to 8c by way of example show designs for the synchronization devices for power shift gears.

FIG. 8a shows a "standard" synchronization device. It provides for a sliding coupling 260 to be arranged in a splined and axially mobile fashion upon a prolongation 262 of a driving shaft 264. Gear wheel 266 with synchronization ring 268 is positioned on that driving shaft 264. The design according to FIG. 8a by way of example can also (as an alternative) be used in connection with the designs according to FIGS. 1 to 7 or according to FIG. 9 or according to FIG. 10 specifically by way of example for the sun wheels there. Of course, the invention figures show something else; the design according to FIG. 8a, for example, can be an alternative. In particular, it can be provided that one uses "standard" internal switching systems, although they make the gear longer.

Synchronization devices according to FIG. 8b or FIG. 8c are particularly advantageous for such planetary gears as they are shown by way of example, in FIGS. 1 to 7 as well as 9 to 10; these figures show two different invention-based variations. As one can see in FIG. 8b, the sliding coupling 270, shown there, is not positioned radially inside on a driving part (see FIG. 8a) but radially outside (see FIG. 8b).

FIG. 8b shows an exemplary invention-based design, where the sliding coupling 270 by way of an alternate connection is provided with different gear wheels for which a synchronization ring 272 or 274 is provided. The prolongations 276 or 278 of the particular gear wheels are so spaced apart axially there or the pertinent synchronization rings 272, 274 are so axially spaced apart that there will be an axial spacing 280 between the particular axially facing end.

An alternate design is shown in FIG. 8c. In this design likewise, the sliding coupling 270—which, of course, is not shown—is not positioned radially inside on a driving part but rather radially outside. The synchronization rings 272 and 274, actuated by this sliding coupling 270 or the prolongations 276, 278 of the two gear wheels, extend in such a way that their mutually facing ends are made in an axially overlapping manner, something that can be a space saver in certain situations. As shown in FIG. 8c, for example, it can be provided that these axially mutually facing ends are positioned on radially different levels.

The designs according to FIG. 8b or FIG. 8c can in a preferred version be employed for the invention-based power shift gears, where the subgears are made as planetary gears, in other words, they can also be present as an alternative in the designs shown in FIGS. 1 to 7 or 9 or 10.

FIG. 9 shows an exemplary invention-based motor vehicle power train 1 with an exemplary invention-based power shift gear, where the first subgear 14 there and the second subgear 16 in each case are made as planetary gears, specifically as Ravigneaux planetary gears. The design according to FIG. 9 is similar to the design according to FIGS. 1 to 7. Corresponding parts are labeled with corresponding reference numbers.

Figure 10:
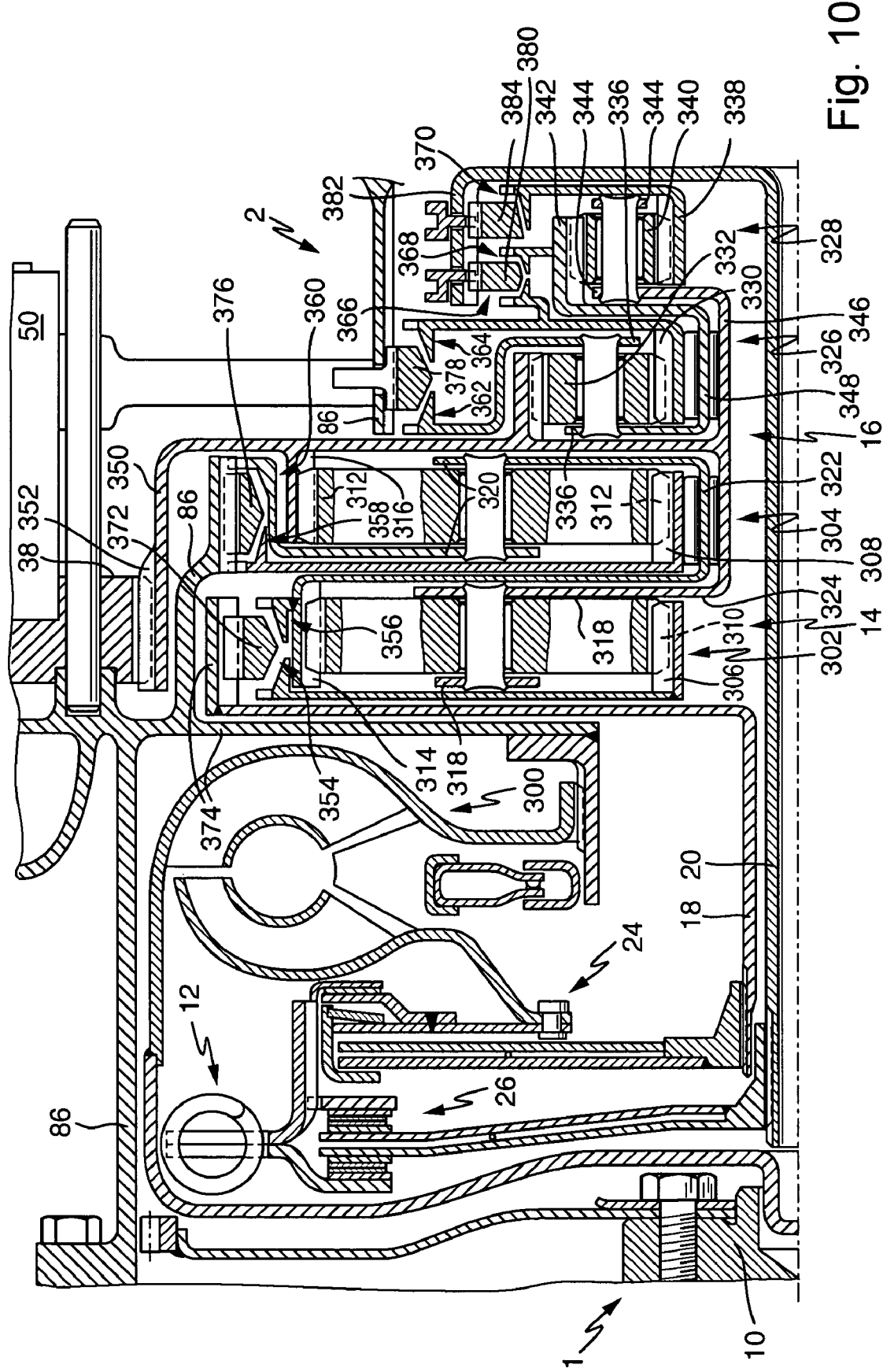
FIG. 10 is a diagram, showing another exemplary invention-based motor vehicle power train with an exemplary invention-based power shift gear.

FIG. 10 is a diagram showing a partial view of another exemplary embodiment of an invention-based motor vehicle power train with an exemplary invention-based power shift gear. The power shift gear has a first subgear 14 as well as a second subgear 16. The first subgear 14 has a first main gear shaft 18. The second subgear 16 has a second main gear shaft 20, which extends into the or in the first main gear shaft 18 that is made as a hollow shaft. In contrast to the designs in FIGS. 1 to 9, looking at the design according to FIG. 10, it is, of course, provided that the even speeds as well as the reverse speed of the power shift gear can be switched by means of the second subgear 16 and that the odd speeds are switched by means of the first subgear 14. In the same way, this can be exchanged in the designs according to FIGS. 1 to 9, which can, of course, also be exchanged in the design according to FIG. 10; other speed associations are also preferred. In the exemplary embodiment according to FIG. 10, there is provided an internal combustion engine that is not shown and that has an power takeoff shaft 10. A dual inertial flywheel 12 is furthermore provided in the torque flow between power takeoff shaft 10 and subgears 14, 16, although that flywheel can also be omitted, as in the design according to FIGS. 1 to 9.

A first clutch 24 is provided on the first main gear shaft 18 and a second clutch 26 is provided on the input side of the second main gear shaft 20. The unit consisting of the first clutch 24 and the second clutch 26 can also be referred to as a dual clutch. A torque converter 300 is also provided.

The odd speeds or the subgear with the odd speeds can—for example, for starting purposes—be connected or coupled with the torque converter 300. It might be noted that in a corresponding manner, a corresponding torque converter can also be integrated into the design according to FIGS. 1 to 9. Torque converter 300 can be closed with a simple clutch; in particular, it can be provided that the first clutch 24 is so designed and arranged that it will serve as a converter-bridging clutch.

The first subgear 14 is made as a Simpson gear or a kind of or modification of a Simpson gear. In a Simpson gear, as a general rule, there is provided a common sun wheel for two wheel sets or two planet wheel sets. In the exemplary invention-based design according to FIG. 10, of course, it is provided that the first subgear 14 have a first wheel set or planet wheel set 302 and a second planet wheel set 304, whereby these planet wheel sets 302, 304 in each case have a sun wheel 306 or 308. Sun wheels 306, 308 here are separated from each other and are arranged relatively movable with respect to each other. Each wheel set 302, 304 has planet wheels 310 or 312, whereby, for example, three or four or five of the several planet wheels can be distributed over the circumference. Besides, each of the wheel sets 302, 304 has a ring gear 314 or 316 as well as a planet carrier 318 or 320.

Ring gear 314 of the first wheel set 302 of the first subgear is connected in a fixed or splined manner with planet carrier 320 of the second wheel set 304 of the first subgear 14 for which, by way of example, one can provide a corresponding prolongation 322 between them. In a corresponding manner, planet carrier 318 of the first wheel set 302 of the first subgear 14 is connected in a fixed or splined manner with the ring gear 316 of the second wheel set 304 of the first subgear 14 for which purpose one can also provide a corresponding prolongation 324.

In the design according to FIG. 10, the second subgear 16 is furthermore made as a Simpson gear or as a kind of Simpson gear. This second subgear 16 likewise has a first wheel set or a first planet wheel set 326 as well as a second planet wheel set or wheel set 328.

The first wheel set 326 has a sun wheel 330, planet wheels 332, a ring gear 334 as well as a planet carrier 336. By way of example, three or four or five planet wheels 332 can be distributed over the circumference; a different number is also preferred. The second wheel set 328 has a sun wheel 338, planet wheels 340, a ring gear 342 as well as a planet carrier 344. Reference is made to the statements above with regard to the number of planet wheels of the second wheel set 328.

Ring gear 334 of the first wheel set 326 of the second subgear 16 is connected fixedly or in a splined manner with the planet carrier 344 of the second wheel set 328 of the second subgear 16. In a corresponding manner, ring gear 342 of the second wheel set 328 of the second subgear 16 is connected fixedly or in a splined manner with the first wheel set 326 of the second subgear 16. Corresponding prolongations 346 or 348 can be provided for the corresponding ring gear planet carrier clutches.

It can be provided that sun wheel 306 of the first wheel set 302 of the first subgear 14 has the same circle segment diameter as the sun wheel 308 of the second wheel set 304 of the first subgear 14. It can furthermore be provided that the first sun wheel 330 of the first wheel set 326 of the second subgear 16 has the same circle segment diameter as sun wheel 338 of the second wheel set 328 of the second subgear 16. It can also be provided that the circle segment diameter of sun wheels 308, 306 will correspond to the circle segment diameter of sun wheels 330, 338.

Ring gear 334 of the first wheel set 326 of the second subgear 16 is connected in a splined manner with the ring gear 316 of the second wheel set 304 of the first subgear 14. A prolongation 350 is connected with these ring gears 316, 334 or is fixedly arranged on them, and on that prolongation, there is provided a toothing 352 for the engagement of a transfer or transmission chain 38, which, by way of example, can be so switched as explained in FIGS. 1 to 7.

The first subgear 14 has speed clutches 354, 356, 358, 360. The first main gear shaft 18 is connected in a splined manner with the sun wheel 306 of the first wheel set 302 of the first subgear 14 by engaging speed clutch 354. The first main gear shaft 18 is connected in a splined manner with ring gear 314 of the first wheel set 302 of the first subgear 14 and thus also with the planet carrier 320 of the second wheel set 304 of the first subgear 14 by engaging the speed clutch 356. Sun wheel 308 of the second wheel set 304 of the first subgear 14 is fixed on or opposite housing 86 by engaging speed clutch 358. Planet carrier 320 of the second wheel set 304 of the third subgear 14, and thus also ring gear 314 of the first wheel set 302 of the first subgear 14, is fixed on or opposite housing 86 by engaging speed clutch 360.

A sliding coupling 372 is provided, especially as a part of corresponding clutches; it is arranged in a splined manner and in an axially movable fashion on the first main gear shaft 18 or a prolongation 374 of the first main gear shaft 18. This sliding coupling 372 is used for the optional engagement of clutches 354 or 356 so that, in each case, only one of these two clutches 354, 356 can be engaged simultaneously.

This also applies accordingly to sliding coupling 376, which is arranged in a splined manner and in an axially movable fashion on housing 86. The speed clutch 358 or the speed clutch 360 can be engaged optionally by means of this sliding coupling 376 so that, in each case, only one of these two speed clutches 358, 360 can be engaged simultaneously.

It is understood that driving the vehicle via the first subgear 14 is not possible when identical parts of the third subgear 14, on the one hand, are firmly connected with the first main gear shaft 18 and, on the other hand, with housing 86. Corresponding positions of sliding couplings 372, 376 or the speed clutches can, for example, of course, also be used for a steering wheel lock or the like.

Speed clutches 362, 364, 366, 368, 370 are provided to engage the speeds of the second subgear 16. Planet carrier 336 of the first wheel set 326 of the first subgear 16—and thus also ring gear 342 of the second wheel set 328 of the second subgear 16—is fixed on or opposite housing 86 by engaging speed clutch 362. Sun wheel 330 of the first wheel set 326 of the second subgear 16 is fixed on or opposite housing 86 by engaging speed clutch 364. The second main gear shaft 20 is connected in a splined manner with sun wheel 330 of the first wheel set 326 of the second subgear 16 by engaging the speed clutch 366. The second main gear shaft 20 is connected in a splined manner with ring gear 342 of the second wheel set 328 of the second subgear 16 and thus also with the planet carrier 336 of the first wheel set 326 of the second subgear 16 by engaging speed clutch 368. The second main gear shaft 20 is connected in a splined manner with sun wheel 338 of second wheel set 328 of the second subgear 16 by closing speed clutch 370.

As noted earlier with regard to the first subgear 14, it is also true of the second subgear 16 that, while driving the vehicle or for the purpose of driving the vehicle, identical parts must not simultaneously be connected by engaging corresponding clutches with the second main gear shaft 20 and must simultaneously be fixed opposite the housing, provided a torque for driving purposes is to be transmitted via this second subgear 16. Nevertheless, such gear-shifting arrangements, for example, can be used for the purpose of serving as a steering wheel lock or the like.

A sliding coupling 378 is provided, which is arranged in a splined manner and axially shiftable fashion on housing 86 and via which one can engage either speed clutch 362 or speed clutch 364. Also provided is a sliding coupling 380 that is arranged in a splined manner and in an axially shiftable fashion on the second main gear shaft 20 or on the prolongation 382, arranged hereupon. Either speed clutch 366 or speed clutch 368 can be engaged optionally by means of this sliding coupling 380. Moreover, a sliding coupling 384 is provided, which is also arranged in an axially shiftable fashion and in a splined manner upon the second main gear shaft 20 or the latter's prolongation 382 and by means of which speed clutch 370 can be engaged.

In the exemplary embodiment according to FIG. 10, the sliding couplings or the speed clutches are extended radially outward. This is so arranged that at least one of the ring gears will be arranged radially within a particular sliding coupling or speed clutch. But this can also be designed in a different manner.

A switching actuator or a control unit 50 is furthermore provided; it is indicated here in a schematic fashion. This control unit, for example, can essentially be so designed as was explained already in FIGS. 1 to 7; of course, this can also involve an adaptation to the position of the corresponding sliding couplings. But one can also provide a different type of switching actuator or a different type of control unit 50, which, for example, can also display switching forks or the like. The switching actuator or the control unit 50, for example, can be of the electromechanical type and, in particular, can be so designed that it will precisely have an electric motor for the actuation of all speed clutches of the first subgear 14 and the second subgear 16.

It is particularly provided in the exemplary embodiments according to FIGS. 1 to 7 or FIG. 9 or FIG. 10 that the speed clutches, located there for engaging and disengaging the speeds of the particular first subgear 14—in other words, especially the segments or surfaces of the speed clutches, which, when the particular speed clutch for torque transmission is in the engaged state, will contact each other and, when the particular speed clutch for the prevention of a torque transmission is disengaged, will not contact each other—are arranged radially outside the toothing of at least one sun wheel of the particular first subgear. In the mentioned designs, this is so arranged that, in each case, all speed clutches—or the surfaces or segments involved for the engagement and disengagement of the speeds of the first particular subgear 14—are arranged radially outside the toothings of all sun wheels of the particular first subgear. The toothings involved here are those that engage a toothing of planet wheels.

It is furthermore, in particular, provided in the exemplary embodiments according to FIGS. 1 to 7 or FIG. 9 or FIG. 10 that the speed clutches, located there for the engagement and disengagement of the speeds of the particular second subgear 14—in other words, especially the segments or surfaces of the speed clutches, which, when the particular speed clutch for torque transmission is in the engaged state, will contact each other and, when the particular speed clutch for the prevention of a torque transmission is disengaged, will not contact each other—are arranged radially outside the toothing of at least one sun wheel of the particular second subgear 16. In the mentioned designs, this is so arranged that, in each case, all speed clutches—or the mentioned surfaces or segments for the engagement and disengagement of the speeds of the particular second subgear 16—are arranged radially outside the toothings of all sun wheels of the particular first subgear. The toothings involved here are those that engage a toothing of planet wheels.

It is especially provided in the exemplary embodiments according to FIGS. 1 to 7 or FIG. 9 or FIG. 10 that the speed clutches, located there for the engagement and disengagement of the speeds of the particular second subgear 14—in other words, especially the segments or surfaces of the speed clutches, which, when the particular speed clutch for torque transmission is in the engaged state, will contact each other and, when the particular speed clutch for the prevention of a torque transmission is disengaged, will not contact each other—are arranged radially outside the toothing of the (FIGS. 1 to 7 or FIG. 9) or at least one sun wheel (FIG. 10) of the particular first subgear 14. This is so arranged in the designs according to FIG. 10 that all speed clutches—or the surfaces or segments for the engagement and disengagement of the speeds of the particular first subgear 14—are arranged radially outside the toothings of all—in this case, especially two—ring gears of the particular first subgear. The above applies in the design according to FIG. 10 additionally to the speed clutches for engaging and disengaging the speeds of the second subgear 16 with regard to the ring gears of the second subgear 16. As an alternative, the designs according to FIGS. 1 to 7 or 9 can also be so arranged that the speed clutches for engaging and disengaging the speeds of the second subgear 16 are also located there radially outside the toothing of the ring gear located there. The toothings mentioned here, in particular, are those that engage a toothing of planet wheels.

It is particularly provided in the exemplary embodiments according to FIGS. 1 to 7 or FIG. 9 or FIG. 10 that those of the speed clutches, located there for the engagement and disengagement of speeds that can generate a splined connection between a part of the particular planetary gear and a main gear shaft, are so designed and arranged that (when in the engaged state) they can transmit at torque, whereby this torque is initiated by the particular main gear shaft in an area in the speed clutch or the latter's particular sliding coupling, which [area] is located further radially outward than the segments or surfaces of the speed clutch, which, when the speed clutch for torque transmission is engaged, will contact each other and when the speed clutch is disengaged for the purpose of preventing a torque transmission, will not contact each other.

The exemplary embodiment according to FIGS. 1 to 7 shows a hollow or essentially hollow cylindrical part of the control unit 50, which, in the example shown there, is the first camshaft controller 158 and that extends around the first planetary gear 28 of the first subgear or extends radially outward. It is provided, in particular, that speed clutches can be actuated by means of this part or camshaft controller. This part is mobile; it is here specifically arranged in a rotational manner in the circumferential direction and in an axially fixed manner. Such a hollow part of the control unit 50, which extends around the first planetary gear 28 of the second planetary gear 30 and which is arranged movably, is not shown in FIG. 9 or FIG. 10—where the control unit 50 is indicated only schematically—but can be present there also in a preferred design.

There is furthermore precisely one electric motor 52 in the exemplary embodiment according to FIG. 1 to FIG. 7; by means of that electric motor, all speeds of the first planetary gear 28 or of subgear 14 and of the second planetary gear 30 or subgear 16 can be engaged and disengaged, and by means of it, all pertinent selection processes can be performed. Such an electric motor 52 with the function mentioned is not shown in FIG. 9 and FIG. 10 but can possibly exist there also in the preferred design.

It is especially provided in the exemplary embodiments according to FIGS. 1 to 7 or FIG. 9 or FIG. 10 that a or the ring gear of the first subgear 14 or planetary gear 28 be connected in a splined manner with a or the ring gear of the second subgear 16 or planetary gear 30.

As one can gather especially from the exemplary embodiments according to FIGS. 1 to 10, the invention makes it possible to connect the advantages of a power shift gear with the low cost, the light weight and the sturdiness of a planetary gear. Furthermore, the designs according to these exemplary embodiments facilitate improved fuel economy as well as reduce costs and a lighter weight when compared to automatic gears that have planet sets.

As shown by the exemplary embodiments according to FIGS. 1 to 10, looking at an invention-based gear, one can provide two mutually connected or coupled planetary gears, each of which will have its own main gear shaft. Furthermore, one can optionally provide at torque converter. Furthermore one can especially provide clutches or a dual clutch, whereby these clutches, in particular, can be wet clutches as well as synchronized speed clutches, which, in particular, can be made as claw clutches. Moreover, one can provide an electromotor or electromechanical actuator or control unit and a transmission chain. In these exemplary embodiments according to FIGS. 1 to 10, there is provided a planetary gear, especially in order to generate the odd speeds, especially the speeds "1," "3" and "5." The other planetary gear is provided especially in order to generate particularly the speeds "2," "4" and "6" as well as the reverse speed. It can be provided—as shown by one of these exemplary embodiments, although that can also apply to other exemplary embodiments—that the odd speeds can be connected with a torque converter, specifically, for example, for starting. Such a torque converter can be closed and/or it can be bridged with a central clutch. As shown by the exemplary embodiments, the even speeds can be connected with a simple clutch, which, provided it is present, will connect the converter housing with the input shaft. The planet sets or planetary gears can share a common output part or can be connected correspondingly, something that can also be gathered from these exemplary embodiments. As one can also gather from the exemplary embodiments, the output torque can be transmitted to a differential for which purpose, for example, one can provide a transmission chain, especially in vehicles with front-wheel drive. The synchronized speed clutches, especially synchronized claw clutches, are provided especially in order to couple the various elements of the planetary gears together.

The speed clutches or the claw clutches and—if present—the torque converter clutches can be actuated by means of an electromechanical actuator or by means of an electromechanical control unit. When present, the converter can, for example, be supplied and cooled by a pump, especially a small pump—although this point has so far not been touched upon.

It might be noted that different variants of this system are possible, such as, for example, those that employ only starting clutches in place of the converter and/or display different layouts of the planetary gears and/or have different actuation principles or control units.

It is especially the designs according to FIGS. 1 to 10 that show that special advantages can be achieved according to the invention, at least in preferred designs. Some of these advantages will be listed below; in this connection, it should be noted that not every embodiment of the invention need display all of these advantages. The invention instead could also cover those designs that do not feature these advantages or that feature them only partly.

For example, the total gear costs are less than in typical automatic gears. The weight can definitely be reduced when compared to conventional automatic gears or phaseless gears (CVT) or power shift gears. The invention furthermore makes it possible to reduce the length of the gear quite definitely when compared to other types of gears, something that can be significant, for example, in front-wheel drive vehicles. Fuel economy can be improved in the context of a wet power shift gear or it can even be arranged in a better fashion. The reduced weight can be significant here in terms of fuel economy. It can furthermore be made possible that no special cooling system for the clutches will be required. One can provide that the starting energy be absorbed by the converter, if present. Moreover, this design can be so arranged that the switching energy will definitely be reduced, something that can be effectively achieved by the clutches. Events that require a lot of energy such as, for example, choking the energy or stopping on an upgrade, can be absorbed in a simple manner as in known automatic gears by means of the torque converter—if present—as in known automatic gears [sic].

Starting, creeping as well as a hill-holder function can be controlled easily or can be implemented easily and are stable, especially due to the torque converter starting device, if present. Crankshaft starter generators (CSG) can also be used in these designs. Here again, the costs of the initial outfitter can be reduced in these designs.

It is particularly advantageous to employ two planetary gears with a dual clutch and an electromechanical actuation system to reduce the cost, the length and the weight of a power shift gear.

FIGS. 11 to 14, by way of example, show invention-based motor vehicle power trains 400 with exemplary invention-based motor vehicle gears 402.

Figure 11:
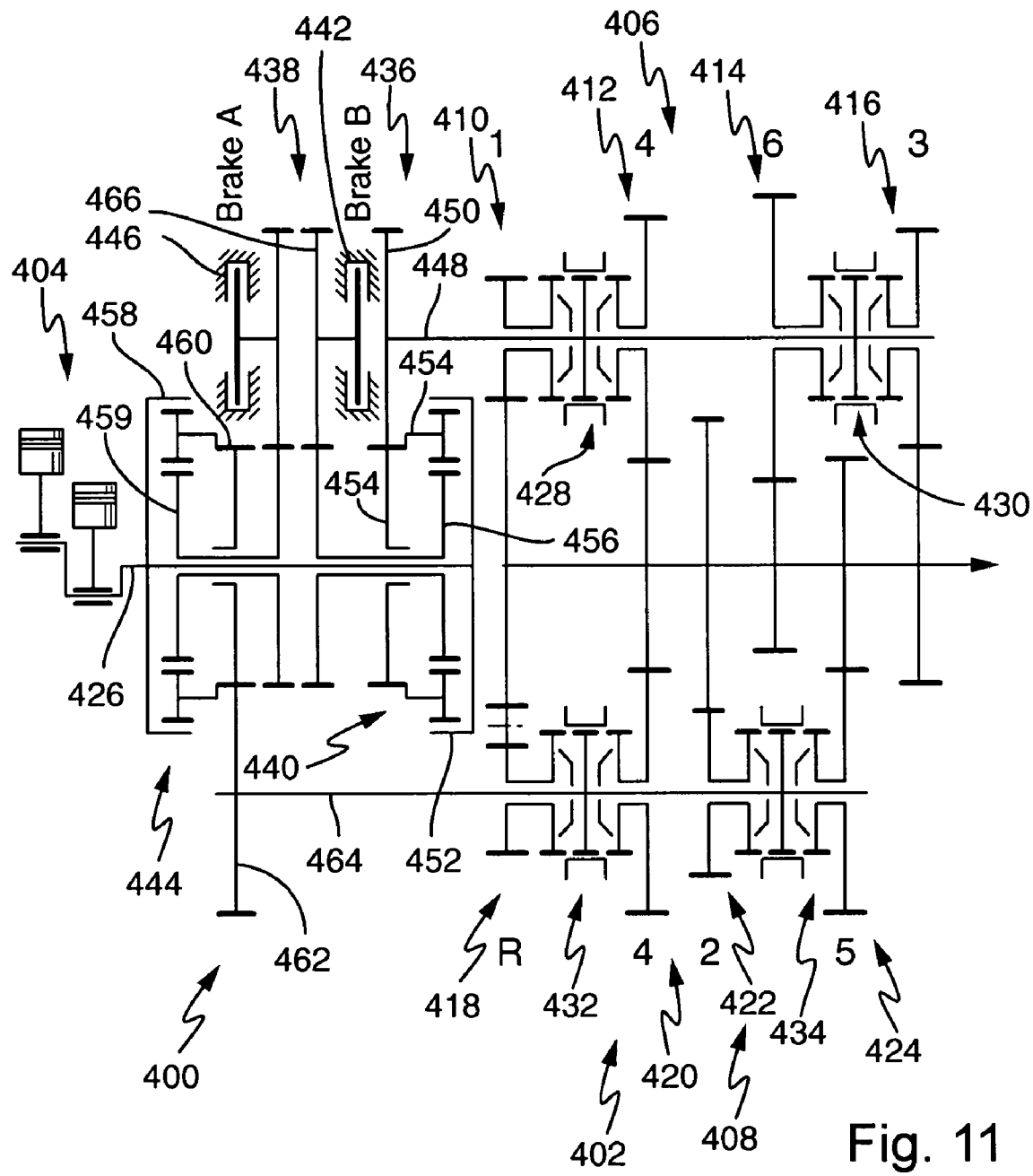
FIG. 11 is a diagram, illustrating an exemplary invention-based motor vehicle power train with an exemplary invention-based motor vehicle gear.
Figure 12:
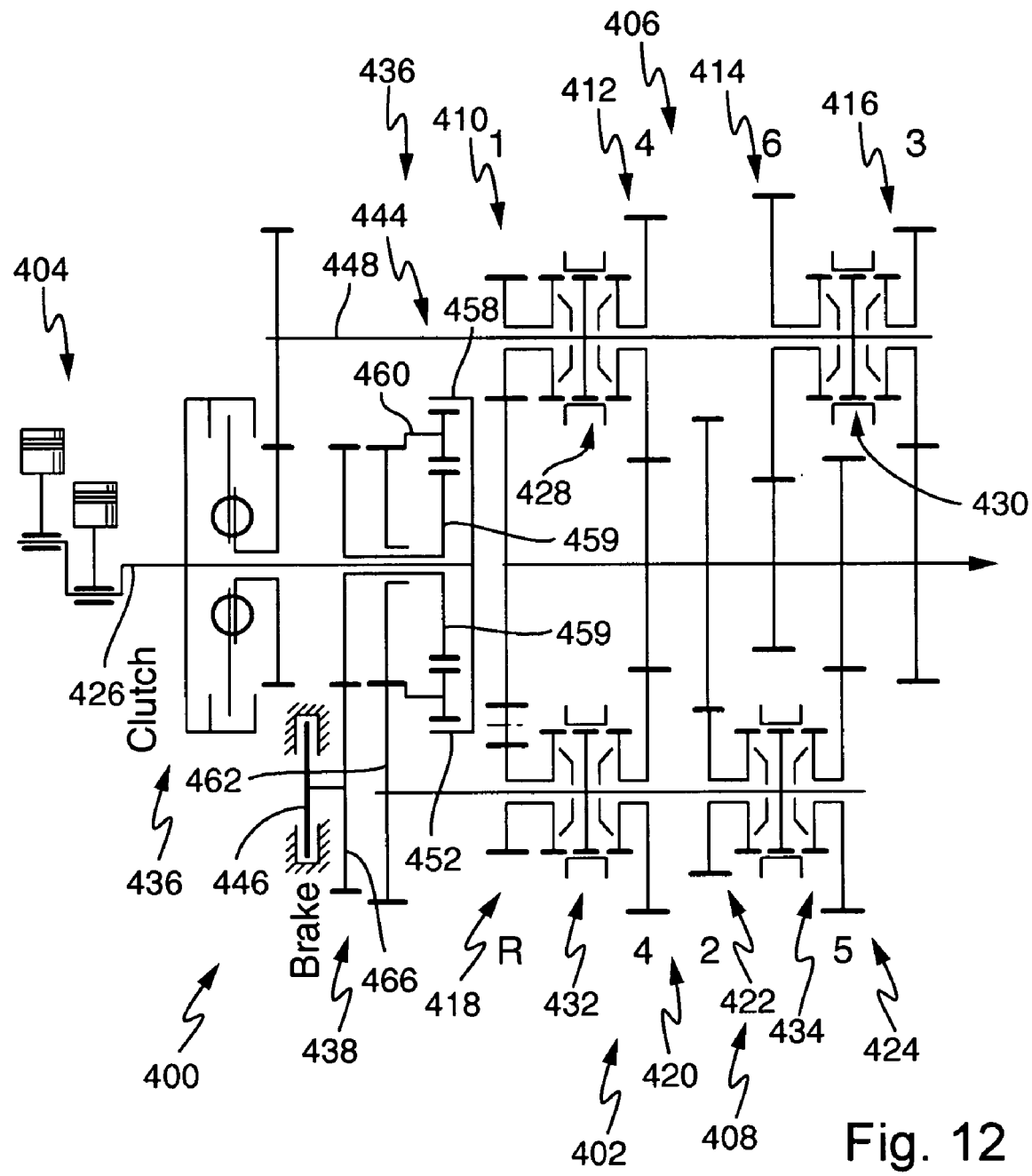
FIG. 12 is a diagram, showing another exemplary invention-based motor vehicle power train with another exemplary invention-based motor vehicle gear.

In the exemplary embodiments according to FIGS. 11 and 12, the motor vehicle gear 402 is made as a dual clutch gear or as a power shift gear. In the exemplary embodiment according to FIGS. 13 and 14, the motor vehicle gear 402 is made as an uninterruptible gearbox (USG).

An internal combustion engine 404 is provided by means of which power train 400 can be driven. Motor vehicle gear 402 has a plurality of wheel sets 410, 412, 414, 416, 418, 420, 422, 424 to form speeds. The part of the motor vehicle gear in which the speeds are formed is designed in the gear reduction mode. The designs according to FIGS. 11 and 12 provide that the motor vehicle gear have a first subgear 406 as well as a second subgear 408 that is connected parallel to the first subgear 406.

The speeds that can be switched in these exemplary embodiments are indicated symbolically by the corresponding speed number or by the letter "R" that represents the reverse gear. It might be noted in this connection that the gear number, of course, can also be arranged differently.

The fourth speed is present twice in the exemplary embodiment according to FIGS. 11 and 12, specifically once in the third first subgear 406 and once in the second subgear 408.

A power takeoff shaft 426 of the internal combustion engine 404 can be found in the exemplary embodiments according to FIGS. 11 to 14.

Speed clutches 428, 430, 432, 434 are found furthermore in these designs. These speed clutches 428, 430, 432, 434 are especially provided with synchronization devices. This is such that, in particular, these speed clutches 428, 430, 432, 434 are operatively arranged for the purpose of engaging a speed between a gear wheel of a particular wheel set and a shaft supporting this gear wheel such that a form fit can be generated and can be released for the purpose of disengaging the speed.

The exemplary embodiments according to FIGS. 11 to 14 furthermore in each case provide two torque transmission devices 236, 238 that act as a clutch. In this connection, it might, of course, be mentioned that exemplary embodiments are also covered by the invention if they have only one clutch as an acting torque transmission device or which have three or more torque transmission devices acting as a clutch.

It is provided in the exemplary embodiments according to FIGS. 11 to 14 that at least one of the torque transmission devices 236, 238 acting as a clutch be formed by a planetary gear and a brake device—and that also applies where more than two torque transmission devices which act as a clutch are provided or when only one is provided.

In the design according to FIGS. 11 and 12, the first torque transmission device 436 is connected with a first subgear 406 and the second torque transmission device 438 is connected with a second subgear 408.

In the exemplary embodiment according to FIG. 11, it is provided that the first torque transmission device 436 and the second torque transmission device 438 be formed in each case by a planetary gear 440 or 444 and a brake device 442 or 446. It is provided here also that the first planetary gear 440 be connected with an input part and an output part and that the second planetary gear 444 likewise be connected with an input part and an output part. The connection is so arranged that a torque can be transmitted. It can be a fixed connection or also, for example, a gear wheel connection. It is provided in the exemplary embodiment according to FIG. 11 that the ring gear 452 of the first planetary gear 440 be firmly connected with the power takeoff shaft 426, which, in this case, forms the input part for the first planetary gear 440, and that the planet carrier 454 of the first planetary gear 440 be connected with a gear wheel 450 that sits on a first shaft 448 of the first subgear 406. This is so arranged here that the planet carrier 454 has an additional toothing that engages the toothing of this gear wheel 450, which, in this particular case, forms an output part for the first planetary gear 440.

With reference to a group of movably arranged parts of the first planetary gear 440, which comprises the ring gear 452, the planet carrier 454 and the sun wheel 456 of this first planetary gear 440, there is connected with the brake device 442 a part—in this case, sun wheel 456—that is formed neither with the input part for the first planetary gear 440, which in this case is formed by the power takeoff shaft 426, nor with the output part for the first planetary gear 440, which in this case is formed by the gear wheel 450. The connection here is especially so arranged that the brake device 442 can act upon this part, here, specifically, sun wheel 456.

With regard to the second planetary gear 444 of the second torque transmission device 438, the power takeoff shaft 426 in the design according to FIG. 11 or also in the design according to FIG. 12 forms an input part for the second planetary gear 442. Ring gear 458 of the second planetary gear 444 of the second torque transmission device 438 is fixedly connected with this input part 426 for the second planetary gear 442. This second planetary gear 444 furthermore has a sun wheel 459 and a planet carrier 460. In the exemplary embodiment according to FIG. 11 or FIG. 12, planet carrier 460 is connected with a gear wheel 462 that forms the output part for the second planetary gear 442, which gear wheel 462 in this case sits on a second shaft 464 of the second subgear 408.

Sun wheel 459 of the second planetary gear, which is thus connected neither with the input part nor with the output part, is connected in the designs according to FIG. 11 or FIG. 12 with the second brake device 446. Sun wheel 459 has an additional toothing that engages another gear wheel 466 upon which this second brake device 446 can act.

It is provided in the exemplary embodiment according to FIG. 12 that the first torque transmission device 436 be formed as a "standard" clutch, such as, for example, a friction clutch. In this case, the second torque transmission device 438 is formed by a planetary gear 444 and a brake device 446. The gear-switching arrangement of the planetary gear 444 and of this brake device 446 essentially corresponds to the one that was explained earlier in FIG. 11 with regard to the second torque transmission device. In contrast to FIG. 11, where both clutches of the dual clutch arrangement are replaced by a planetary gear and a brake device in the design according to FIG. 12, only one clutch of the dual clutch device is replaced by a planetary gear and a brake device.

The functional mode and the switching strategies for the designs according to FIGS. 11 and 12 can essentially be those that are already known for dual clutch gears. In particular, it is also provided that these arrangements—where a clutch such as a friction clutch is replaced by a torque transmission device acting as a clutch, which torque transmission device has a planetary gear and a brake device—essentially perform the same functions and use the same switching strategies as those designs where all torque transmission devices are made as a clutch, such as a friction clutch or the like.

As mentioned earlier, FIGS. 13 and 14 show a partial view of a power train 400 with a motor vehicle gear device, which is made as an uninterruptible gearbox (USG).

Figure 13:
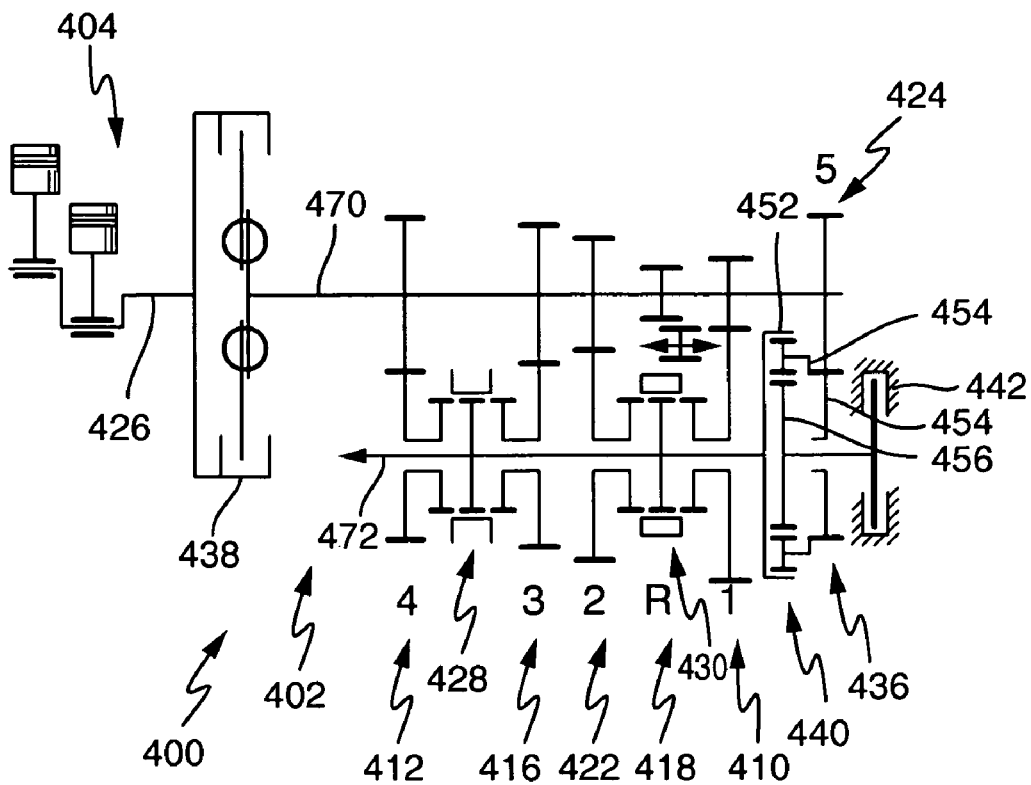
FIG. 13 is a diagram, showing another exemplary invention-based motor vehicle power train with another exemplary invention-based motor vehicle gear.
Figure 14:
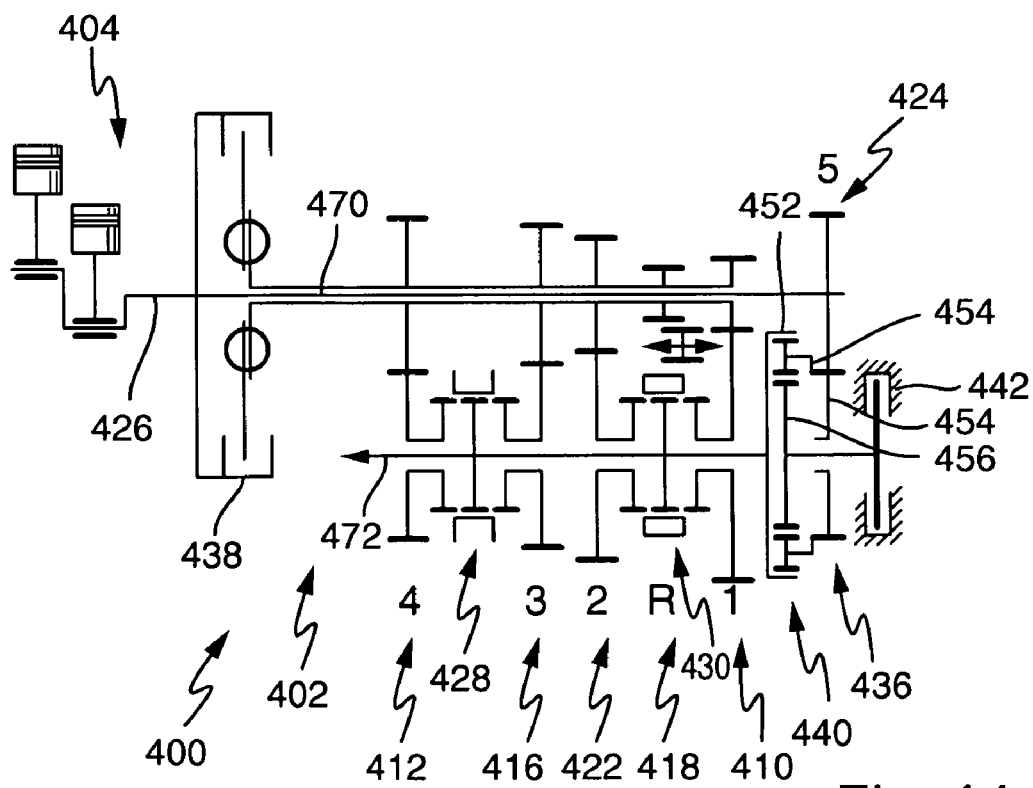
FIG. 14 is a diagram, showing another exemplary invention-based motor vehicle power train with another exemplary invention-based motor vehicle gear.

In the designs according to FIGS. 13 and 14, a second torque transmission device 438 is provided between the power takeoff shaft 426 and a (first) main gear shaft 470. This second torque transmission device 438 in this case is a starting clutch or acts as a starting clutch. The second torque transmission device 438, for example, can be a friction clutch. Main gear shaft 470 supports several gear wheels of the wheel sets that form the speeds.

This is so arranged in the design according to FIG. 13 that, of each of the wheel sets forming the speeds, one wheel will be supported by main gear shaft 470.

In the design according to FIG. 14, this is so arranged that—apart from the maximum forward speed, which in this case by way of example is the fifth speed—one gear wheel out of each of the remaining wheel sets that form the speeds will be supported by the main gear shaft 470.

In the design according to FIG. 14, the (first) main gear shaft 370 is made as a hollow shaft. Power takeoff shaft 426 or a shaft driven by it extends to this hollow shaft. On that power takeoff shaft 426 or a shaft coupled with it sits a gear wheel of the wheel set for the highest speed.

Furthermore, the designs according to FIGS. 13 and 14 display a main gear shaft 472.

In the design according to FIG. 14, the power takeoff shaft 426 or—provided this is the case—a shaft connected herewith can also be referred to as a (second) input shaft or main gear shaft, specifically especially as an input shaft for the wheel set of the fifth speed.

A first torque transmission device 436 is provided between this (second) input shaft 426 (FIG. 14) or (first) main gear shaft 470 (FIG. 13) and the power takeoff shaft 472, which first torque transmission device 436 is formed by a planetary gear 440 and a brake device 442 that cooperates herewith.

It is provided here that the ring gear 452 of this planetary gear 440 be firmly connected with the power takeoff shaft 472, which, in this particular case, forms an output part for the first planetary gear 440. Planet carrier 454 of this first planetary gear 440 has an additional toothing, which engages the toothing of a gear wheel supported on shaft 426 (FIG. 14) or 470 (FIG. 13), which gear wheel is associated with wheel set 424. This gear wheel forms an input part for the first planetary gear 440 so that the planet carrier 454 is connected with the input part. Sun wheel 456 of planetary gear 440 is connected with brake device 442.

The first torque transmission device 436 acts as a power shift gear in the designs according to FIG. 13 and FIG. 14. It is thus provided in the design according to FIG. 13 or FIG. 14 that one can switch back and forth between speeds without any interruption of the traction force. A torque can be transmitted in this way in the meantime via the highest speed step, in other words, in this case, the fifth speed. In a preferred design, one can adjust the number of revolutions during switching by means of this first torque transmission device 436 that acts as a power shift clutch.

As shown in FIGS. 13 and 14 in these exemplary embodiments, the USG clutch, or the power shift clutch, which is found in known uninterruptible gearboxes (USG), is replaced by a planetary gear 440 and a brake device 442. The planetary gear in these embodiments is connected between an input shaft 470 (FIG. 13) or the power takeoff shaft or crankshaft 426 (FIG. 14) and an output shaft 472 or is connected with them.

An advantageous design features functional modes and switching strategies in the case of the designs according to FIGS. 13 and 14 as in known uninterruptible gearboxes that use a USG clutch or power shift clutch.

It is especially the designs according to FIGS. 13 and 14 that feature a plurality of different strategies and variants for the positioning of the planetary gear sets and the brake devices. The planetary gear set, for instance, can also be connected with the power takeoff shaft 426 or the crankshaft and/or with an input shaft 470 and/or with an output shaft 472. Furthermore, for example, one can further provide that the planetary gear 440 could also be connected with speeds or gear wheels or with the speeds in the planetary gear that are connected with the brakes. These designs make it possible to position the brake device outside (dry brake) or inside (wet brake) of the gear or the gear housing, whereby possibly one uses a shaft and gear wheels, in particular, as transmission section. The brake device facilitates a great degree of freedom in terms of its positioning, whereby, for example, one can use shafts or gear wheels. As especially also in the case of the designs according to FIGS. 11 and 12, in these designs likewise according to FIGS. 13 and 14, it is possible to connect an electrical machine with the power takeoff shaft or a crankshaft or one or several of the shafts arranged inside the gear or the gear housing, where all shafts and speeds or gear wheels are lubricated or oiled or can be lubricated or oiled because all of them are arranged or can be arranged inside the gear housing.

These designs can especially be made in the form of electronic gearboxes (ESG).

Many advantages can thus be made possible, as one can see especially in the designs according to FIGS. 11 to 14. In this connection, of course, it might be mentioned that these advantages need not always be present so that this invention would also cover designs where these advantages are not available or where only a few of the advantages are available.

In the following, we will mention only a few advantages by way of example. For example, one can bring about an improved distribution of heat, which is due to the friction forces, because the brake device or the brake devices 442, 446 can be arranged also outside the gear housing and in this case especially can be made as a dry brake. The brakes need not be arranged in a row with the shafts inside the gear housing (use of angular speeds). Furthermore, it is now possible to connect an electrical machine with the power takeoff shaft or a crankshaft and one or several shafts that, for example, are oiled or lubricated completely inside the gear housing. It is furthermore made possible to position a brake device or brake devices 442, 446 outside the gear housing, which, in turn, makes it possible in a simple manner to exchange parts of the brake device that have become worn out. It is furthermore advantageous that it is now possible to use either dry brakes or wet brakes. Furthermore, the axial structural length can be shortened (for example, combination of inertial flywheel or dual inertial flywheel with a ring gear of the planetary gear or the like).

Applicant, of course, knows that in automatic gears, planetary gears are coupled with a brake that is made as a wet brake. There, of course, the design is used not as a clutch or it does not act as a clutch.

As is shown especially in FIGS. 11 to 14, in other words, according to the invention, one can modify an uninterruptible gearbox or dual clutch gear to the extent that one or several of the clutches located there be replaced by a planetary gear and brake. The brake device here can especially be connected with the remaining gear wheel (in this case, the sun wheel) in or of the planetary gear, in other words, the wheel that is not connected with the input shaft (in the example, the ring gear) or the output shaft (in the example, the planet carrier), whereby it is advantageously made possible to have this combination act as a clutch. This design, especially the design according to FIGS. 11 to 14, can also be made as electronic gearboxes (ESG). But it is also possible to make it as a mere uninterruptible gearbox or as a dual clutch gear.

It might be noted that we must distinguish between the first or second planetary gear to form speeds (for example, FIGS. 1 to 10) and a first or second planetary gear, which in cooperation with a particular brake device, works as a clutch.

LIST OF REFERENCES

1 Motor vehicle power train
2 Power shift gear
10 Power takeoff shaft
12 Dual inertial flywheel
14 First subgear of 2
16 Second subgear of 2
18 First main gear shaft
20 Second main gear shaft
22 Dual clutch
24 First clutch
26 Second clutch
28 First planetary gear
30 Second planetary gear
32 Ring gear of 28
34 Ring gear of 30
36 Prolongation of 32, 34
38 Chain
40 Driving axles
42 Wheel set
43 Wheel set of 28
44 Differential
45 Wheel set of 30
46 Sun wheel of 42
47 Dotted area with 43 for even speeds
48 Planet carrier of 42
49 Dotted area with 45 for odd speeds
50 Control unit for 2
52 Electric motor
54 Control unit for 22
56 Small sun wheel of 28
58 Large sun wheel of 28
60 Short planet wheel of 28
62 Long planet wheel of 28
64 Planet carrier of 28
68 Prolongation of 56
70 Prolongation of 58
72 First prolongation of 64
74 Second prolongation of 64
76 Speed clutch of 28
78 Speed clutch of 28
80 Speed clutch of 28
82 Speed clutch of 28
84 Speed clutch of 28
86 Housing
88 Small sun wheel of 30
90 Large sun wheel of 30
92 Short planet wheel of 30
94 Long planet wheel of 30
96 Common planet carrier of 30
100 Prolongation of 88
102 Prolongation of 90
104 First prolongation of 96
106 Second prolongation of 96
108 Speed clutch of 30
110 Speed clutch of 30
112 Speed clutch of 30
114 Speed clutch of 30
116 Synchronization ring of 76
118 Synchronization ring of 78
120 Synchronization ring of 80
122 Synchronization ring of 82
124 Synchronization ring of 84
126 Synchronization ring of 108
128 Synchronization ring of 110
130 Synchronization ring of 112
132 Synchronization ring of 114
134 Sliding coupling of 76
136 Sliding coupling of 78 and 80
138 Sliding coupling of 82 and 84
140 Sliding coupling of 108 and 110
142 Sliding coupling of 112 and 114
144 Pin, guide pin
146 Pin, guide pin
148 Pin, guide pin
150 Pin, guide pin
152 Pin, guide pin
158 First camshaft controller 160 Second camshaft controller
162 Groove in 158
164 Groove in 158
166 Groove in 158
168 Groove in 158
170 Groove in 158
172 Groove in 158
174 Groove in 158
176 Groove in 158
178 Groove in 158
180 Groove in 158
182 Groove in 158
184 Groove in 158
186 Groove in 160
188 Groove in 160
190 Groove in 160
192 Groove in 160
194 Groove in 160
196 Groove in 160
198 Double arrow
200 Arrow tip of 198 (direction of motion for switching)
202 Arrow tip of 198 (direction of motion for selection)
203 Reference symbol
204 Area
206 Toothing of 158
208 Toothing of 160
210 Electric motor output shaft
212 Interlock [toothed] shaft
214 First unilaterally acting freewheel
216 Second unilaterally acting freewheel
218 Switching selection shaft
220 First gear wheel on 218
222 Second gear wheel on 218
224 First countertoothing
226 Second countertoothing
228 Gear wheel
230 Gear wheel
232 Groove
234 Gear wheel on 46
236 Planet wheel of 42
238 Ring gear of 42
240 Area
242 Wall segment
244 Wall segment
246 Area
248 Wall segment
250 Wall segment
260 Sliding coupling
262 Prolongation of 264
264 Driving shaft
266 Gear wheel
268 Synchronization ring
270 Sliding coupling
272 Synchronization ring
274 Synchronization ring
276 Prolongation of gear wheel
278 Prolongation of gear wheel
280 Axial spacing
300 Torque converter
302 First wheel set of 14
304 Second wheel set of 14
306 Sun wheel 302
308 Sun wheel 304
310 Planet wheel of 302
312 Planet wheel of 304
314 Ring gear of 302
316 Ring gear of 304
318 Planet carrier of 302
320 Planet carrier of 304
322 Prolongation between 314 and 320
324 Prolongation between 316 and 318
326 First wheel set of 16
328 Second wheel set of 16
330 Sun wheel 326
332 Planet wheel of 326
334 Ring gear of 326
336 Planet carrier of 326
338 Sun wheel of 328
340 Planet wheel of 328
342 Ring gear of 328
344 Planet carrier of 328
346 Prolongation between 334 and 344
348 Prolongation between 336 and 342
350 Prolongation on 316, 334
352 Toothing on 350
354 Speed clutch between 18 and 316, 318
356 Speed clutch between 18 and 306
358 Speed clutch between 86 and 308
360 Speed clutch between 86 and 320, 314
362 Speed clutch between 86 and 336, 342
364 Speed clutch between 86 and 330
366 Speed clutch between 20 and 330
368 Speed clutch between 20 and 342, 336
370 Speed clutch 20 and 338
372 Sliding coupling of 14 on 374
374 Prolongation on 318
376 Sliding coupling of 14 on 86
378 Sliding coupling of 16 on 86
380 Sliding coupling of 16 on 20 or 382
382 Prolongation of 20
384 Sliding coupling of 16 on 20 or 382
400 Motor vehicle power train
402 Motor vehicle gear
404 Internal combustion engine
406 First subgear
408 Second subgear
410 Wheel set
412 Wheel set
414 Wheel set
416 Wheel set
418 Wheel set
420 Wheel set
422 Wheel set
424 Wheel set
426 Power takeoff shaft
428 Speed clutches
430 Speed clutches
432 Speed clutches
434 Speed clutches
436 First torque transmission device
438 Second torque transmission device
440 First planetary gear
442 First brake device
444 Second planetary gear
446 Second brake device
448 First shaft of 406
450 Gear wheel on 448
452 Ring gear of 440
454 Planet carrier of 440
456 Sun wheel of 440
458 Ring gear of 444
459 Sun wheel of 444
460 Planet carrier of 444
462 Gear wheel on 464

464 Second shaft 408
466 Gear wheel
470 Main gear shaft
472 Power takeoff shaft

What is claimed is:

1. Power shift gear for motor vehicles comprising:
a first subgear that has a first planetary gear, where the first planetary gear has at least one sun wheel, at least one ring gear, a plurality of planet wheels and at least one planet carrier, where the at least one sun wheel has a toothing for engagement in respective toothings of the planet wheels;
a plurality of speed clutches for engagement and disengagement of speeds in the first subgear;
a second subgear;
a plurality of speed clutches for engagement and disengagement of speeds in the second subgear;
whereby the second subgear is connected parallel to the first subgear, where the plurality of speed clutches for engaging and disengaging of speeds in the first subgear are arranged in the first subgear radially outside the toothing of the at least one sun wheel of the first subgear, and wherein at least one speed clutch from the plurality of speed clutches is at least partially radially aligned with the toothing of the at least one sun wheel of the first sub gear.

2. Power shift gear according to claim 1, wherein the at least one ring gear has a toothing for engagement in respective toothings of the planet wheels, and the plurality of speed clutches for the engagement and disengagement of speeds in the first subgear are arranged in the first subgear radially outside the toothing of the at least one ring gear of the first subgear.

3. Power shift gear according to claim 1, wherein the second subgear has a second planetary gear.

4. Power shift gear according to claim 1, wherein the first subgear has a first main gear shaft upon which is fixedly arranged a first hollow cylindrical prolongation that is extended radially outward via a first connecting part, where on the first hollow cylindrical prolongation, there is retained in an axially mobile manner at least one sliding coupling for at least one speed clutch of the first planetary gear.

5. Power shift gear according to claim 3, wherein the second subgear has a second main gear shaft upon which is fixedly arranged a second hollow cylindrical prolongation that is extended radially outward over a second connecting part, where, upon the second hollow cylindrical prolongation, there is retained in an axially movable manner at least one sliding coupling for at least one speed clutch of the second planetary gear.

6. Power shift gear for motor vehicles comprising:
a first subgear that has a first planetary gear;
a plurality of speed clutches for the engagement and disengagement of speeds in the first subgear;
a second subgear;
a plurality of speed clutches for the engagement and disengagement of speeds in the second subgear; and
a control unit for the actuation of the speed clutches;
whereby the second subgear is connected parallel to the first subgear, where the control unit has at least one hollow first part that is positioned in a movable fashion and that extends around the first planetary gear of the first subgear, wherein the control unit has at least one hollow second part by means of which at least one speed clutch for the engagement and disengagement of speeds in the second subgear can be actuated, and wherein the hollow second part is a second camshaft controller that is provided with a profiling on an inside surface.

7. Power shift gear according to claim 6, wherein by means of the at least one hollow first part, at least one speed clutch for the engagement and disengagement of speeds in the first subgear can be actuated.

8. Power shift gear according to claim 6, wherein the second subgear has a second planetary gear.

9. Power shift gear according to claim 6, wherein the hollow first part is a first camshaft controller that is provided with a profiling on an inside surface for the actuation of all speed clutches of the first planetary gear.

10. Power shift gear according to claim 9, wherein the first camshaft controller is positioned in a rotationally movable and axially fixed manner.

11. Power shift gear according to claim 9, wherein the profiling, provided on the inside surface of the first camshaft controller, is made up of a plurality of grooves.

12. Power shift gear according to claim 11, wherein the grooves that form the profiling provided on the inside surface of the first camshaft controller are so arranged that, looking in the circumferential direction of the first camshaft controller, there are provided severally mutually spaced-apart grooves and that several mutually spaced-apart grooves are provided in the axial direction of the first camshaft controller.

13. Power shift gear according to claim 6, wherein the control unit has a plurality of hollow first parts that are shaped cylindrically and that are arranged concentrically within each other and that can be actuated in a hydraulic manner, whereby the speed clutches of the first planetary gear can be actuated by means of these hollow first parts.

14. Power shift gear according to claim 6, wherein the control unit has several hollow second parts that in each case have a hollow cylindrical shape and are arranged concentrically within each other and can be actuated hydraulically, whereby the speed clutches of the second planetary gear can be actuated by means of the hollow second parts.

15. Power shift gear for motor vehicles comprising:
a first subgear that has a first planetary gear engageable with a first main gear shaft;
a plurality of speed clutches for the engagement and disengagement of speeds in the first subgear;
a second subgear engageable with a second main gear shaft;
a plurality of speed clutches for the engagement and disengagement of speeds in the second subgear; and
a control unit for the actuation of the speed clutches, where this control unit has precisely one electric motor
whereby by means of the one electric motor, all speed clutches for the engagement and disengagement of speeds in the first subgear and in the second subgear can be actuated, and wherein the electric motor has an electric motor output shaft and wherein a mechanical power transmission device, having two camshafts, controllers one for each subgear, is provided between the electric motor output shaft and the speed clutches, and wherein respective unilaterally acting clutches or freewheels are provided between the electric motor and the camshaft controllers of the mechanical transmission device.

16. Power shift gear according to claim 15, wherein the mechanical power transmission device is so designed that movements of the electric motor output shaft for the selection of speeds are geared with a gear ratio that deviates from the particular gear ratio that exists in case of movements of the electric motor output shaft for the purpose of switching speeds.

* * * * *